(12) United States Patent
Komiya et al.

(10) Patent No.: US 7,149,375 B2
(45) Date of Patent: Dec. 12, 2006

(54) OPTICAL WAVEGUIDE MODULE

(75) Inventors: Takeo Komiya, Yokohama (JP);
 Takashi Sasaki, Yokohama (JP);
 Yasushi Fujimura, Yokohama (JP);
 Tsukuru Katsuyama, Yokohama (JP);
 Naoyuki Yamabayashi, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/501,512

(22) PCT Filed: Jan. 15, 2003

(86) PCT No.: PCT/JP03/00289

§ 371 (c)(1),
(2), (4) Date: Jan. 14, 2005

(87) PCT Pub. No.: WO03/060584

PCT Pub. Date: Jul. 24, 2003

(65) Prior Publication Data
US 2005/0117831 A1 Jun. 2, 2005

(30) Foreign Application Priority Data
Jan. 15, 2002 (JP) ............................. 2002-006237

(51) Int. Cl.
*G02B 6/12* (2006.01)
*G02B 6/42* (2006.01)
*G02B 6/26* (2006.01)

(52) U.S. Cl. ............................ 385/14; 385/31; 385/39; 385/47

(58) Field of Classification Search ................... 385/14, 385/31, 39, 47
See application file for complete search history.

(56) References Cited

U.S. PATENT DOCUMENTS 4,797,895 A * 1/1989 Kokubo et al. .......... 372/50.21

(Continued)

FOREIGN PATENT DOCUMENTS

JP 6-331837 12/1994

(Continued)

OTHER PUBLICATIONS

Sasaki T. et al., "Multi-Channel Power Level Monitor with Upward-Reflector and Sensor-Array Integrated in Planar Lightwave Circuit", Optical Fiber Communication Conference (2001), p. WB6.1-WB6.3.

*Primary Examiner*—Brian Healy
*Assistant Examiner*—Jerry Martin Blevins
(74) *Attorney, Agent, or Firm*—McDermott Will & Emery LLP

(57) ABSTRACT

A planar optical waveguide is formed with an optical circuit having an inclined groove. A reflection filter is installed on the inside of the inclined groove 3 crossing a plurality of optical waveguides. Reflected light from the reflection filter is detected by an array of photodetectors to monitor the optical intensity of the signal light. The photodetector array is held by a sub-mounting substrate disposed at the top side of the optical circuit so that a mounting face of the photodetector array is inclined at an angle a ($0° < \alpha < 90°$) with respect to the top surface of the optical circuit such that the reflected light from the reflection filter is made incident onto a light incident face of the photodectors at a predetermined angle $\phi$. The optical waveguide module is capable of monitoring the optical intensity correctly regardless of the polarization state of the signal light.

11 Claims, 19 Drawing Sheets

U.S. PATENT DOCUMENTS

| | | | | |
|---|---|---|---|---|
| 6,061,487 A | * | 5/2000 | Toyama et al. | 385/47 |
| 6,078,707 A | * | 6/2000 | Yamamoto et al. | 385/14 |
| 6,477,285 B1 | * | 11/2002 | Shanley | 385/14 |
| 2001/0053260 A1 | * | 12/2001 | Takizawa et al. | 385/14 |
| 2002/0031307 A1 | * | 3/2002 | Kimura | 385/49 |

FOREIGN PATENT DOCUMENTS

| | | |
|---|---|---|
| JP | 2000-347050 | 12/2000 |
| JP | 2000-347050 A | 12/2000 |
| WO | WO 97/06458 | 2/1997 |

* cited by examiner

OPTICAL WAVEGUIDE MODULE

TECHNICAL FIELD

The present invention relates to an optical waveguide module having an optical waveguide formed on a substrate.

BACKGROUND ART

In an optical circuit, which makes use of an optical waveguide such as an optical fiber or planar optical waveguide, it is sometimes desirable to control the optical intensity of signal light to a suitable value, such as keeping the optical intensity constant for signal light transmitted through optical waveguides. In such a case, the optical intensity of the signal light is monitored in the optical circuit, and sometimes the optical intensity is also controlled on the basis of the results of this monitoring.

DISCLOSURE OF THE INVENTION

This monitoring of the optical intensity of signal light used to be accomplished by providing an optical coupler on an optical waveguide and splitting part of the signal light. With this method, an optical coupler is provided at a specific location along the optical waveguide, a few percent of the signal light is split, and the optical intensity of the split light is monitored with a photodetector, which allows the optical intensity of the signal light transmitted through the optical waveguide to be monitored.

A problem with this use of an optical coupler, though, is that it increases the number of optical components that make up the optical circuit and furthermore, since these have to be fused together, the structure and the manufacturing process of the optical circuit become more complicated.

In contrast, methods have been proposed in which an optical coupler is not used, and instead part of the signal light is reflected and the optical intensity is monitored. With such a monitoring method, for example, at a predetermined position of an optical waveguide in a planar optical waveguide type optical circuit, part of the signal light being transmitted through the optical waveguide is reflected as the reflected light for monitoring in the direction inclined at a predetermined angle with respect to the optical axis. And the reflected light is detected with a photodetector disposed on the substrate on which the optical waveguide is formed, whereby the signal light is monitored.

However, in such monitoring method of the signal light as described above, the reflected light is made incident onto the light incident face of the photodetector disposed on a substrate being inclined at an angle with respect thereto. Here, there occurs a problem in that the photosensitivity for the reflected light at the photodetector varies with polarization states of the signal light, due to the polarization dependence of the light, which passes through the light incident face. In such case, the optical intensity of the signal light cannot be monitored correctly unless the polarization state of the signal light being transmitted through the optical waveguide is identified.

The present invention has been accomplished in order to solve the above problem, and it is an object thereof to provide an optical waveguide module, with which the optical intensity can be correctly monitored regardless of the state of polarization of the signal light.

In order to achieve the above object, an optical waveguide module according to the present invention comprises (1) an optical circuit, constituted by a substrate and an optical waveguide formed on the substrate and having a groove formed at a predetermined inclination angle θ (0°<θ) with respect to the vertical axis perpendicular to the optical axis of the optical waveguide so as to cross a predetermined portion of the optical waveguide, (2) a reflection filter that is installed on the inside of the groove of the optical circuit including a portion where signal light transmitted through the optical waveguide passes through and that reflects part of the signal light according to a specific reflectivity, and (3) a photodetector that detects reflected light of the signal light reflected by the reflection filter, wherein (4) the photodetector is arranged such that the reflected light is made incident onto the light incident face thereof at a predetermined angle with respect thereto.

With the above-mentioned optical waveguide module, rather than the optical waveguide being split with an optical coupler, part of the signal light is reflected by a reflection filter, which is disposed in an inclined groove provided to the optical waveguide, and the optical intensity of the signal light can be monitored by means of the reflected light. As a result, the structure and manufacturing process of the optical circuit are simplified.

Also, there is adopted a constitution made such that the reflected light from the reflection filter is made incident onto the light incident face of the photodetector at a predetermined angle with respect thereto. Here, since the polarization dependence of the light, which passes through the light incident face, is reduced, the photosensitivity for the reflected light at the photodetector can be kept approximately constant regardless of the state of polarization of the signal light. As a consequence, it is made possible to monitor the optical intensity correctly regardless of the state of polarization of the signal light.

As for the incident angle of the reflected light with respect to the light incident face of the photodetector, it is preferred to set the incident angle, for example, to an angle, which is substantially perpendicular to the light incident face, or to an angle within a predetermined range of angle including 90° and so on, in which the polarization dependence of the light, which passes through the light incident face, is sufficiently reduced. Further, as for the optical waveguide provided in the optical circuit, for example, an optical waveguide of planar optical waveguide type formed on the substrate, or an optical fiber fixed onto the substrate may be employed.

BRIEF DESCRIPTION OF THE DRAWINGS

FIG. 15A shows the case where an optical waveguide of planar optical waveguide type is employed as the optical waveguide, and FIG. 15B shows the case where an optical fiber is employed as the optical waveguide.

BEST MODE FOR CARRYING OUT THE INVENTION

Figure 1:
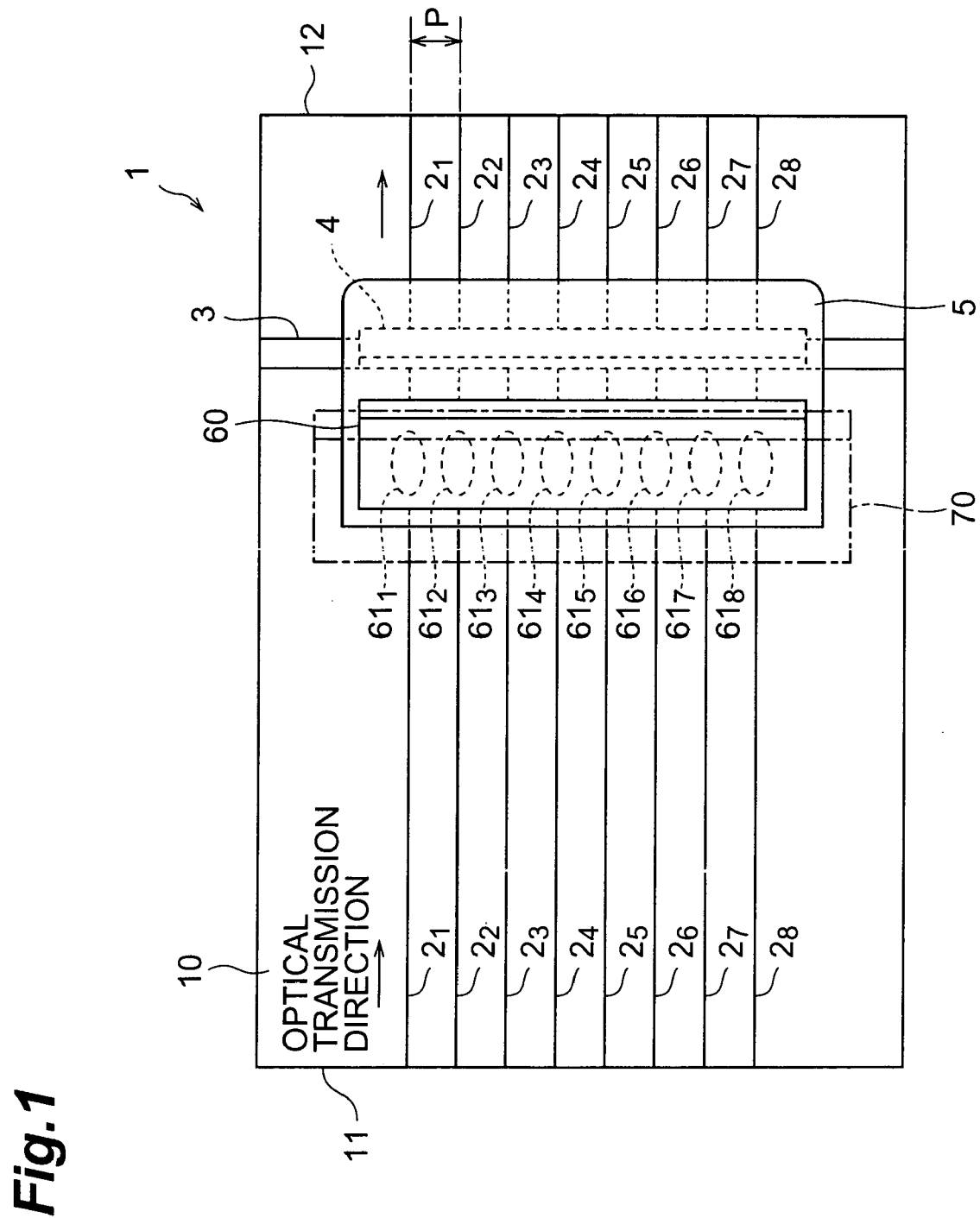
FIG. 1 is a plan view showing a structure of an optical waveguide module in accordance with a first embodiment.

A preferred embodiment of an optical waveguide module in accordance with the present invention will be described below with reference to the drawings. In the descriptions of drawings, the same elements will be given with the same reference numerals and redundant descriptions will be omitted. It is also noted that dimensional ratios in the drawings do not always agree with those in the description.

FIG. 1 is a plan view of a structure of an optical waveguide module in accordance with a first embodiment of the present invention. The optical waveguide module comprises an optical circuit 1 which are constituted of a substrate 10, and 8 optical waveguides $2_1$–$2_8$ (8 channels) disposed on the substrate 10. In this embodiment, for the optical waveguides $2_1$–$2_8$, an optical waveguide of planar optical waveguide type, which are formed on the substrate 10, are employed.

Each of the optical waveguides $2_1$–$2_8$ is formed parallel to each other at regular intervals along a predetermined optical transmission direction (the direction indicated by the arrowheads in FIG. 1) from input end 11 toward output end 12 of a planar optical waveguide type optical circuit 1. Also, at a predetermined portion with respect to the optical transmission direction of the planar optical waveguide type optical circuit 1, a groove 3, which crosses the optical waveguides $2_1$–$2_8$, is formed.

Inside the groove 3, a reflection filter 4 for reflecting part of signal light, which is transmitted through each of the optical waveguides $2_1$–$2_8$, with a predetermined reflectance is provided. In this embodiment, the inside of the groove 3 is sealed with filler resin 5. Furthermore, at a position further upstream than the groove 3, on the top side of the planar optical waveguide type optical circuit 1, a sub-mounting substrate 70 and a photodetector array 60 are provided. The photodetector array 60 has 8 photodetectors $61_1$–$61_8$ corresponding to each of the 8 optical waveguides $2_1$–$2_8$ in the planar optical waveguide type optical circuit 1.

In FIG. 1, with respect to the photodetectors $61_1$–$61_8$, the shape of each light receiving surface is represented by dotted line. Further, as for the sub-mounting substrate 70, to represent the structure of the photodetector array 60, photodetectors $61_1$-$61_8$ and the like, only the installation position thereof is indicated by dot-dashed lines. Furthermore, the planar optical waveguide type optical circuit 1 and the sub-mounting substrate 70, or, the sub-mounting substrate 70 and the photodetector array 60 are fixed by means of, for example, soldering.

Figure 2:
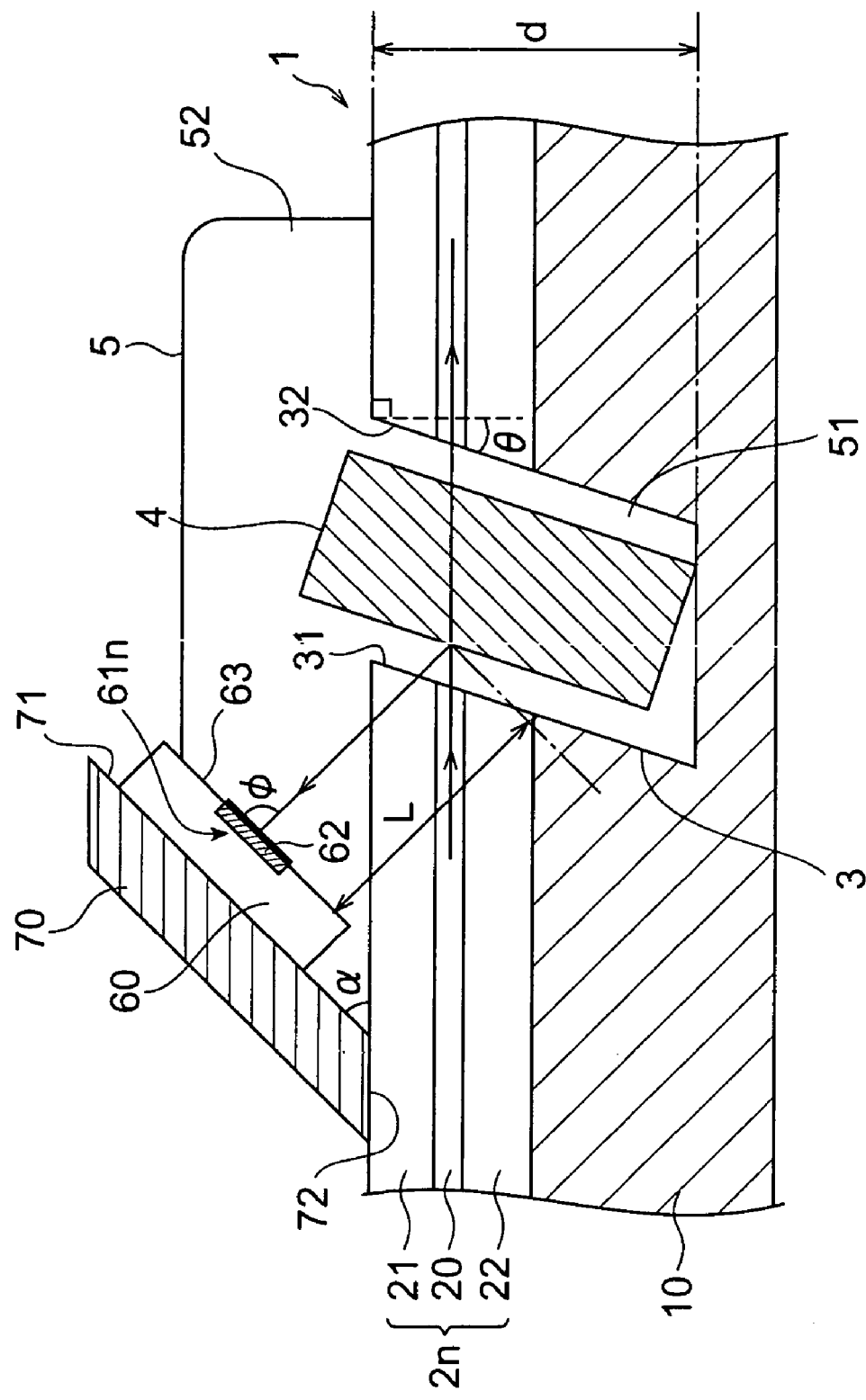
FIG. 2 is a cross sectional view showing a partially enlarged structure of cross section along the optical axis of the optical waveguide module shown in FIG. 1.

FIG. 2 is a cross sectional view showing a structure of cross section of the optical waveguide module shown in FIG. 1 along the direction of the optical axis of the optical waveguides $2_n$ (n=1–8) (the optical transmission direction of the planar optical waveguide type optical circuit 1). In FIG. 2, a portion, which includes the groove 3, the reflection filter 4, and the photodetector array 60, is shown enlarged.

As shown in FIG. 2, the optical waveguides $2_n$ in the planar optical waveguide type optical circuit 1 is constituted of a lower clad 22, a core 20 and an upper clad 21 being formed on the substrate 10. The groove 3, that cuts across the optical waveguides $2_n$ at a predetermined portion, is formed obliquely at a specific inclination angle θ (0°<θ) with respect to the vertical axis perpendicular to the optical axis of the optical waveguides $2_n$ (perpendicular to the substrate 10) to a depth d including at least the portion, where signal light transmitted through the optical waveguides $2_n$ passes through, corresponding to the core 20. In this embodiment, the depth d of the groove 3 is set to be greater than the thickness of the optical waveguides $2_n$ up to the lower clad 22.

The reflection filter 4 is inserted on the inside of the groove 3. The reflection filter 4 is installed so as to include at least the portion where the signal light transmitted through the optical waveguide $2_n$ passes through, at substantially the same angle θ, as the groove 3 with respect to the optical axis. The reflection filter 4 is preferably comprised of a dielectric multi-layer film filter and is designed such that part of the signal light with a predetermined wavelength (within a predetermined wavelength band), transmitted through the optical waveguides $2_n$ is reflected with a specific reflectance.

Provided at the top side of the upper clad 21 of the planar optical waveguide type optical circuit 1 is the sub-mounting substrate 70. The sub-mounting substrate 70 is a mounting member for mounting the photodetector array 60, and one face thereof is a photodetector mounting face 71 for mounting the photodetector array 60 having the photodetectors $61_n$ (n=1–8) each corresponding to the optical waveguides $2_n$. The photodetector array 60 is disposed on the photodetector mounting face 71 such that each of the reflected lights reflected by the reflection filter 4, which are part of the signal light transmitted through the optical waveguides $2_n$, is made incident onto a light receiving portion 62 of the corresponding photodetectors $61_n$.

The sub-mounting substrate 70 is fixed on the top surface of the planar optical waveguide type optical circuit 1 via a substrate fixing face 72, which is a face adjacent to the photodetector mounting face 71. Further, the substrate fixing face 72 is formed with an angle larger than 90° with respect to the photodetector mounting face 71. As a consequence, there is made an arrangement such that the photodetector mounting face 71 is inclined at an angle $\alpha$ ($0° < \alpha < 90°$) with respect to the top surface of the planar optical waveguide type optical circuit 1. The angle $\alpha$ is determined by referring to the light path of the reflected light from the reflection filter 4.

In the example of structure shown in FIG. 2, for the photodetectors $61_n$ of the photodetector array 60, a front-face incident type photodiode is used. The surface of the photodetector array 60, in which the light receiving portion 62 of the photodetectors $61_n$ is provided at the side opposite to the sub-mounting substrate 70, is the light incident face 63 for the reflected light from the reflection filter 4.

As shown in FIG. 2, the angle $\alpha$ formed by the photodetector mounting face 71 and the top surface of the planar optical waveguide type optical circuit 1 is so set that the reflected light from the reflection filter 4 is made incident onto the light incident face 63 of the photodetectors $61_n$ at a predetermined angle with respect thereto (angle $\phi$ shown in FIG. 2). Here, there is made an arrangement such that the angle formed by the light incident face 63 of the photodetector array 60 and the top surface of the planar optical waveguide type optical circuit 1 is the above-described angle $\alpha$.

Also, on the light incident face 63 of the photodetectors $61_n$, an anti-reflection coat (AR coat), which is a coat film for preventing the reflection of the light within a predetermined wavelength band corresponding to the wavelength band of the signal light transmitted through the optical waveguides $2_n$, is formed.

The inside of the groove 3 including the reflection filter 4 is sealed with the filler resin 5. The filler resin 5 in the present embodiment is composed of an inner filler resin portion 51 sealing the inside of the groove 3, and an upper filler resin portion 52 sealing a specific portion of the top surface side of the planar optical waveguide type optical circuit 1 including the upper portion of the groove 3. These inner filler resin portion 51 and the upper filler resin portion 52 are integrally formed using the same resin material.

With the above-described structure, when the signal light transmitted through an optical waveguide $2_n$ is emitted via an upstream end face 31 to the inner filler resin portion 51 inside the groove 3, the reflection filter 4, which is inclined with respect the optical axis, reflects part of the signal light diagonally above the planar optical waveguide type optical circuit 1 at a predetermined reflectance. The rest of the signal light passes through the inner filler resin portion 51 and reflection filter 4, and is again made incident onto the optical waveguides $2_n$ via a downstream end face 32.

Meanwhile, the light reflected by the reflection filter 4, reaches the photodetector array 60 through the inner filler resin portion 51, the optical waveguides $2_n$ and the upper filler resin portion 52, and is made incident onto the photodetectors $61_n$ through the light incident face 63 at a predetermined incident angle $\phi$. Thus, the optical intensity of the signal light transmitted through the optical waveguides $2_n$ is monitored based on the optical intensity of the reflected light, detected by the light receiving portion 62 of the photodetectors $61_n$.

Effects of the optical waveguide module in accordance with the embodiment will be described below.

With the optical waveguide module shown in FIG. 1 and FIG. 2, rather than the optical waveguide itself being split with an optical coupler, part of the signal light is reflected by the reflection filter 4 disposed in the inclined groove 3 formed on the optical waveguides $2_n$, and the optical intensity of the signal light can be monitored by means of the reflected light. As a consequence, the structure and the manufacturing process of the optical circuit are simplified.

Also, the following structure is adopted. That is, the reflected light from the reflection filter 4 is made incident onto the light incident face 63 of the photodetectors $61_n$ of the photodetector array 60 at a predetermined angle with respect thereto. Here, the polarization dependence of the light passing through the light incident face 63 is reduced. Accordingly, it is possible to maintain the photosensitivity of the reflected light at the photodetectors $61_n$ to a constant level regardless of the polarization state of the signal light. As a consequence, the optical intensity can be monitored correctly regardless of the polarization state of the signal light.

Here, there is a need to set the incident angle $\phi$ of the reflected light with respect to the light incident face 63 of the photodetectors $61_n$ to an angle such that polarization dependence of the light passing through the light incident face 63 is satisfactorily reduced. To be more specific, for example, it is preferred to set the angle to be substantially perpendicular to the light incident face 63. Or, it is preferred to set the angle within a predetermined range of angle including 90°. As for the photodetector for the photodetector array, a rear-face incident type photodiode may be used. In this case, the light receiving portion of the photodetector is formed on the face opposite to the light incident face.

Further, in the optical waveguide module shown in FIG. 1, for the structure that the reflected light is made incident onto the light incident face 63 of the photodetectors $61_n$ at a predetermined angle with respect thereto, the following structure is adopted. That is, the sub-mounting substrate 70, which is a mounting member, is disposed on the top side of the planar optical waveguide type optical circuit 1; and the photodetector array 60 including the photodetectors $61_n$ is held by the photodetector mounting face 71, which is inclined at an angle $\alpha$ ($0° < \alpha < 90°$) with respect to the top surface of the planar optical waveguide type optical circuit 1.

By adopting the above-described mounting member, it is possible to place the photodetector array 60 including photodetectors $61_n$ in a positional state being inclined with respect to the top surface of the planar optical waveguide type optical circuit 1 in such manner. That is, the light path of the reflected light, which is emitted being inclined at a specific angle with respect to the planar optical waveguide type optical circuit 1, and the light incident face 63 of the photodetectors $61_n$ form the above-described predetermined angle.

Further, in the optical waveguide module, a plurality of channels is provided for the optical waveguides $2_n$ in the planar optical waveguide type optical circuit 1 and for the corresponding photodetectors $61_n$ in the photodetector array 60. In such structure as described above, when a problem of cross talk arises between the adjacent channels, it is preferred that, assuming that the distance between the adjacent optical waveguides $2_n$ in the planar optical waveguide type optical circuit 1 is P (refer to FIG. 1); and the optical path length from the reflection filter 4 to the light incident face 63 of the photodetector array 60 is L (refer to FIG. 2), the distance P and the optical path length L set to satisfy the condition L/P<4. Or, furthermore, it is preferred to set the distance P and the optical path length L to satisfy the condition L/P<2. Owing to the structure as described above, the cross talk between the adjacent channels can be reduced. As an example of the structure that meets the above condition L/P<4, a structure in which the optical waveguide distance is P=250 μm, and the optical path length of the reflected light is L=500 μm is available.

As the optical circuit, in which the optical waveguides are provided on the substrate and the groove for inserting the reflection filter is formed, in FIG. 1 and FIG. 2, the planar optical waveguide type optical circuit 1 employing optical waveguides $2_n$ of planar optical waveguide type is shown. However, optical circuits having another structure may be employed. For example, an optical circuit, which is constituted of an optical fiber as the optical waveguide fixed on the substrate, or an optical circuit, which is constituted of a planar optical waveguide type optical waveguide together with an optical fiber, may be employed.

The structure and effects of the optical waveguide module shown in FIG. 1 and FIG. 2 will be described further in detail.

Figure 3:
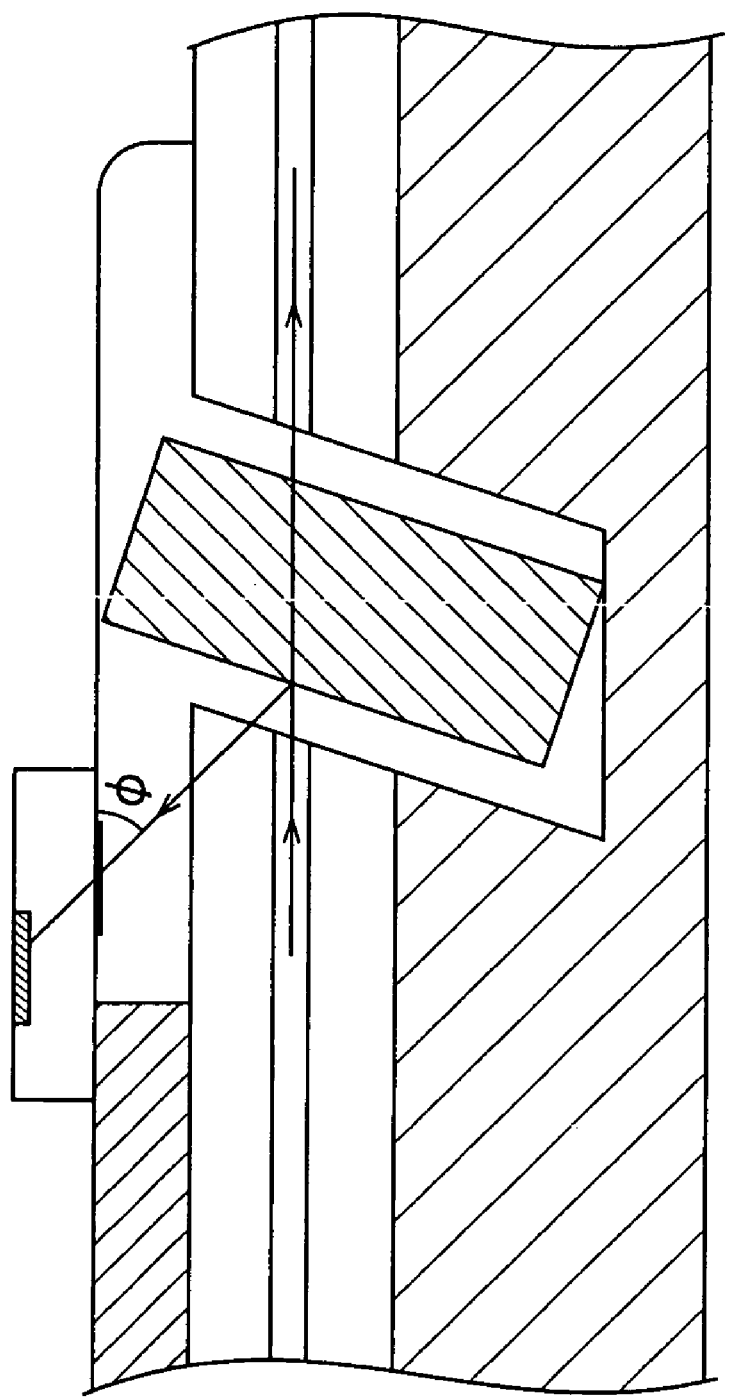
FIG. 3 is a cross sectional view showing the exemplary structure of the optical waveguide module.

FIG. 3 is a cross sectional view showing an example of a structure of an optical waveguide module. In the example of this structure, on a sub-mounting substrate, which is provided at the top side of a planar optical waveguide type optical circuit, photodetectors are disposed parallel to the optical circuit. In the structure as described above, the angle φ with respect to the light incident face of the photodetectors, at which the reflected light from the reflection filter is made incident onto it, is to be expressed as an angle, which is inclined being largely deviated from 90° as shown in FIG. 3. In this case, in the transmission characteristics of the light passing through the light incident face, polarization dependence due to the incident angle φ is generated.

That is, due to the fact that the incident angle φ to the light incident face is largely deviated from 90°, the transmittance values at the light incident face are different from each other between s-wave and p-wave, which are optical components having polarization state different from each other in the light, which passes through the light incident face. And due to the polarization dependence in the transmittance, the photosensitivity at the photodetector with respect to the reflected light from the reflection filter varies depending on the polarization state of the light.

FIGS. 4A–4C and FIGS. 5A–5C are graphs showing the polarization dependence of the photosensitivity in the photodetector. In these graphs of FIGS. 4A–4C and FIGS. 5A–5C, the abscissa axis represents wavelength (μm) of incident light; the ordinate axis represents photosensitivity (dB) for the s-wave or p-wave in the photodetector. Also, in each graph, the solid line represents the photosensitivity for the s-wave; the dashed line represents photosensitivity for the p-wave.

Here, assuming a structure in which the light incident face of the photodetector is formed with an AR coat of SiON film, simulations with respect to the changes in polarization dependent photosensitivity are made while altering the film thickness t and the refractive index n of the AR coat. Also, the incident angle of the light with respect to the light incident face of the photodetector is set to 15°.

Generally, the refractive index of the photodetector is largely different from the refractive index of the optical waveguide or the like. To cope with this, by forming AR coat according to need, excess reflection, which is generated when the reflected light is made incident onto the photodetector, is reduced, and thereby the polarization dependence generated there from can be reduced.

Figure 4A:
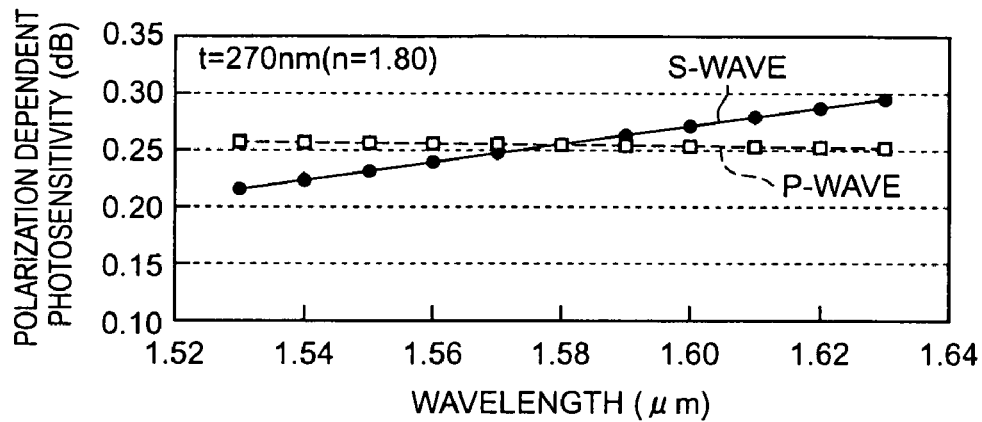
FIG. 4A–FIG. 4C are graphs each showing the polarization dependence of photosensitivity in photodetectors.
Figure 4B:
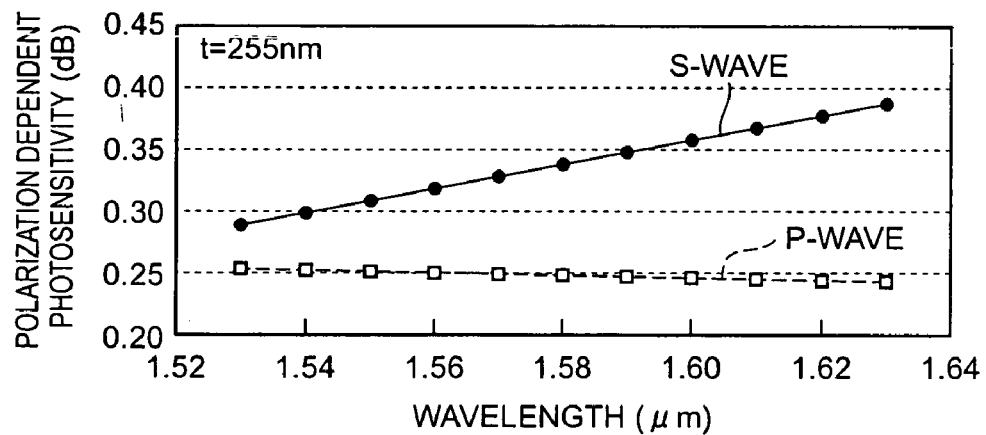
Figure 4C:
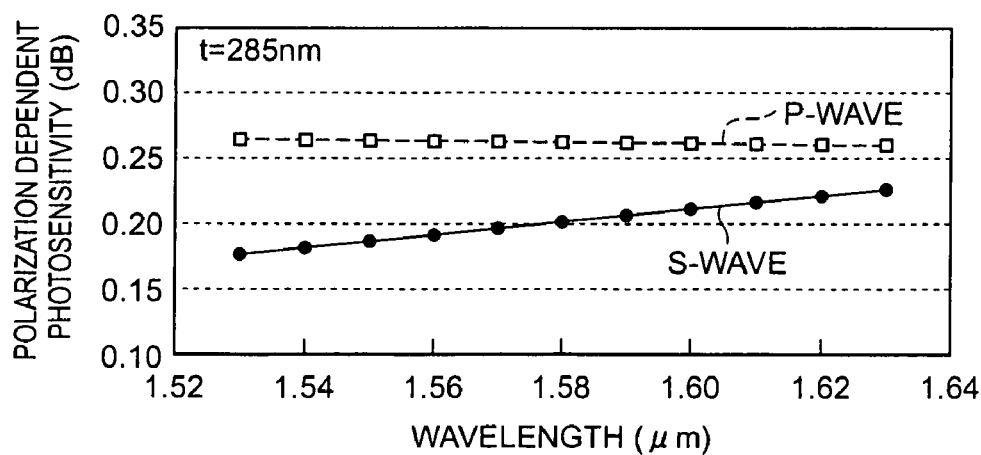

The graphs in FIGS. 4A–4C show changes in the polarization dependent photosensitivity when the film thickness t of the AR coat is altered. The refractive index n is fixed to n=1.80.

FIG. 4A is a graph showing the wavelength dependence of the polarization dependent photosensitivity when the film thickness of the AR coat is set to t=270 nm, and the refractive index is set to n=1.80 as the optimum conditions in which polarization dependence of the photosensitivity with respect to the light having a wavelength of 1.53 μm–1.63 μm is resulted in the minimum. Under these optimum conditions, the polarization dependence of the photosensitivity is relatively small over the above-mentioned wavelength band.

On the other hand, FIG. 4B is a graph showing the wavelength dependence in the polarization dependent photosensitivity when the film thickness t is set to 255 nm, which is smaller than the optimum condition by 15 nm. Also, FIG. 4C is a graph showing the wavelength dependence in the polarization dependent photosensitivity when the film thickness t is set to 285 nm, which is larger than the optimum condition by 15 nm. As shown in the graphs, by deviating the film thickness t of the AR coat from the optimum condition, it is understood that the polarization dependence of the photosensitivity becomes larger.

Figure 5A:
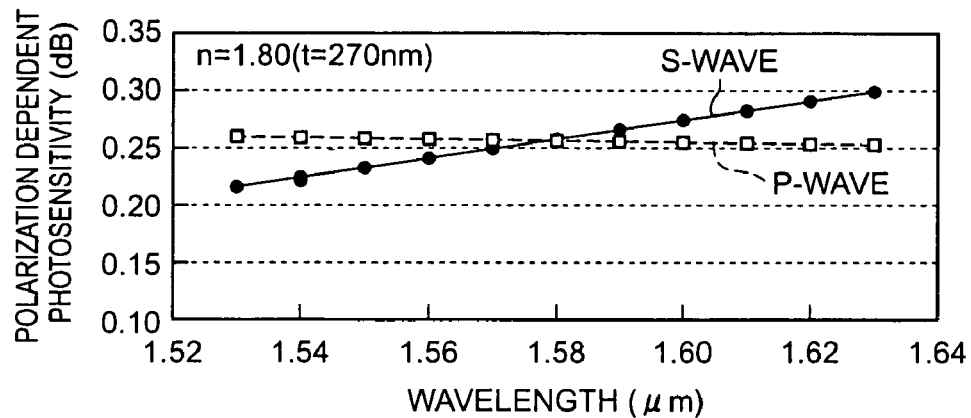
FIG. 5A–FIG. 5C are graphs each showing the polarization dependence of photosensitivity in photodetectors.
Figure 5B:
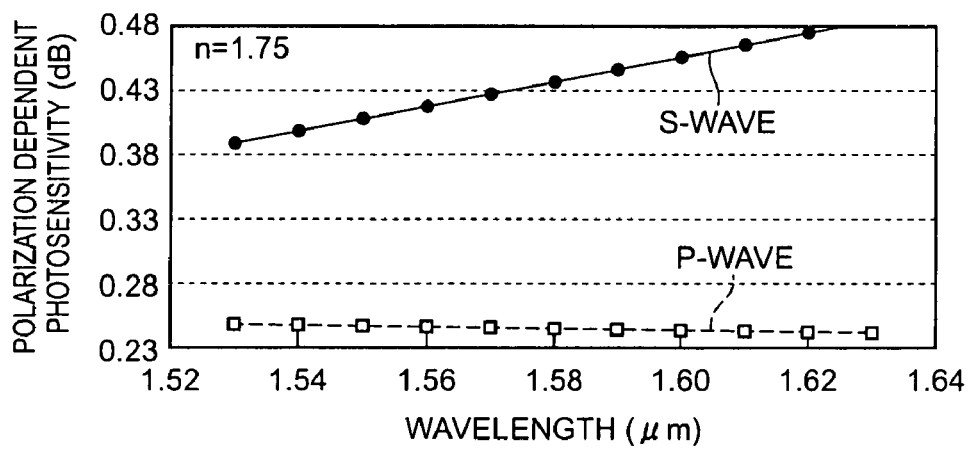
Figure 5C:
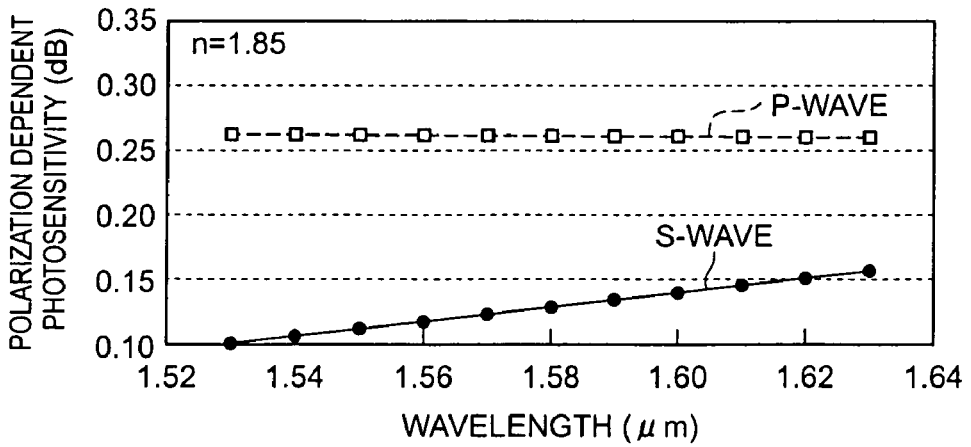

The graphs in FIGS. 5A–5C show the changes of the polarization dependent photosensitivity when the refractive index n of the AR coat is altered. The film thickness t is fixed to t=270 nm.

As is the case with FIG. 4A, FIG. 5A is a graph showing the wavelength dependence of the polarization dependent photosensitivity when the film thickness of the AR coat is set to t=270 nm, and the refractive index is set to n=1.80 as the optimum conditions, in which the polarization dependence of the photosensitivity with respect to the light having a wavelength of 1.53 μm–1.63 μm becomes the minimum. Under these optimum conditions, the polarization dependence of the photosensitivity becomes relatively small over the above-mentioned wavelength band.

On the other hand, FIG. 5B is a graph showing the wavelength dependence in the polarization dependent photosensitivity when the refractive index n is set to 1.75, which is smaller than the optimum condition by 0.05. Also, FIG. 5C is a graph showing the wavelength dependence in the polarization dependent photosensitivity when the refractive index n is set to 1.85, which is larger than optimum condition by 0.05. As shown in the graphs, by deviating the refractive index n of the AR coat from the optimum condition, as is the case of the film thickness t, it is understood that the polarization dependence of the photosensitivity becomes larger.

As shown in each graph in FIGS. 4A–4C, and FIGS. 5A–5C, in the constitutions in which the incident angle with respect to the light incident face of the photodetector is largely deviated from 90°, due to the deviation in the film thickness t or the refractive index n of the AR coat from the optimum condition, the polarization dependence of the light passing through the light incident face becomes larger sharply. Thus, the polarization dependence of the photosensitivity in the photodetector is increased. As described above, when the polarization dependence of the photosensitivity in the photodetector is large and the photosensitivity with respect to the conditions such as film thickness t and refractive index n of the AR coat is instable, correlation between the optical intensity of the signal light, which is transmitted through the optical waveguide, and the optical intensity of the reflected light, which is detected by the photodetector, varies depending on the polarization state of the signal light. As a result, the optical intensity of the signal light cannot be monitored correctly.

On the other hand, in the optical waveguide module shown in FIG. 1 and FIG. 2, the photodetector array 60, which is provided at the top side of the planar optical waveguide type optical circuit, is not disposed parallel to the optical circuit 1 as it is, but is disposed such that the reflected light from the reflection filter 4 is made incident onto the light incident face 63 of the photodetectors $61_n$ at a predetermined angle. As a consequence, the polarization dependence of the light passing through the light incident face 63 becomes small. Thus, the polarization dependence of the photosensitivity of the reflected light in the photodetectors $61_n$ can be reduced.

Figure 6A:
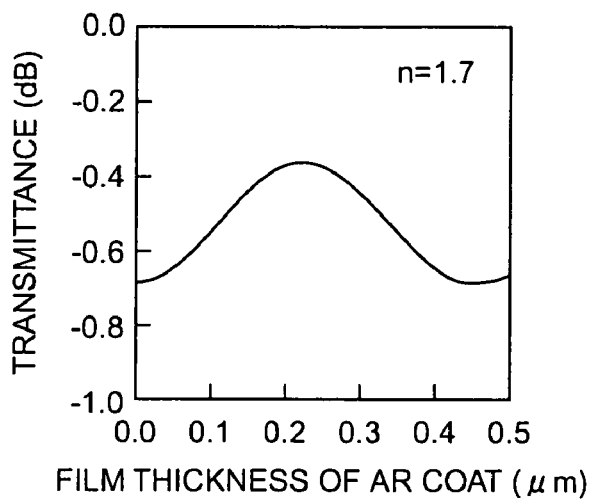
FIG. 6A–FIG. 6C are graphs each showing a change of light transmittance with respect to the film thickness of an AR coat at light incident face.
Figure 6B:
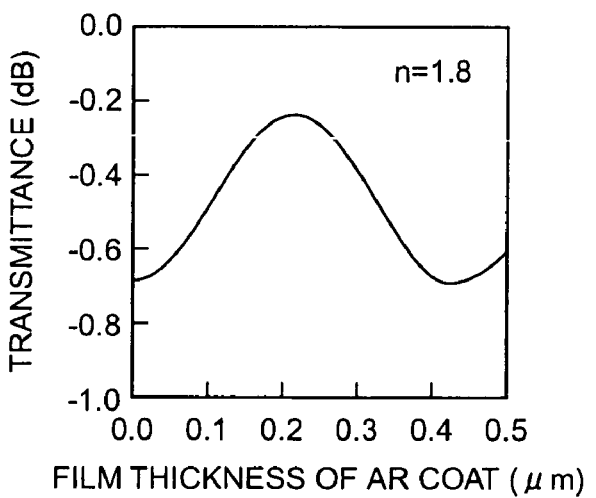
Figure 6C:
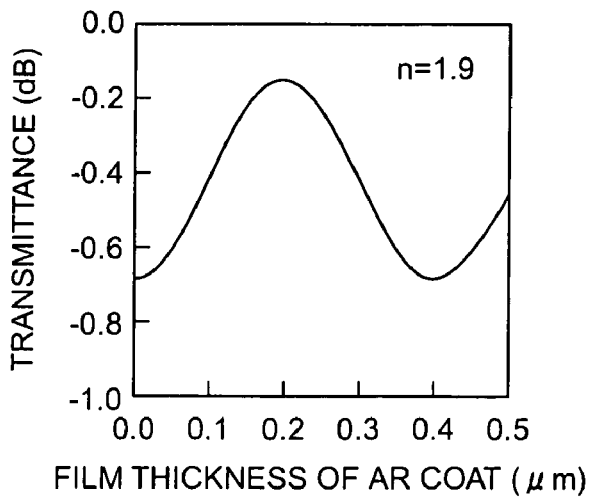

FIGS. 6A–6C are graphs showing the changes in the transmittance of light at the light incident face depending on the film thickness of the AR coat. In the graphs in FIGS. 6A–6C, the abscissa axis represents film thickness (µm) of the AR coat; the ordinate axis represents the transmittance (dB) of the light at the light incident face.

The graphs in FIGS. 6A–6C show the changes in the transmittance of light depending on the film thickness when the light with a wavelength of 1.55 µm is made incident onto the light incident face at an angle of 90°. Here, the refractive index of the filler resin between the planar optical waveguide type optical circuit and the photodetector is set to 1.52. Also, the refractive index n of the AR coat is set to (A) n=1.70, (B) n=1.80, and (C) n=1.90, respectively.

As shown in these graphs, in each graph, the transmittance of light varies depending on the film thickness of the AR coat. However, in the constitutions, in which the incident angle of the light is set to 90°, the transmittance of the light with respect to s-wave and p-wave agrees with each other. That is, the polarization dependence of the photosensitivity in the photodetector is not generated in principle. Accordingly, to reduce the polarization dependence of the photosensitivity, it is preferred to set the incident angle of the light with respect to the photodetector to an angle substantially perpendicular thereto; or to a predetermined angle within a predetermined range of angle including 90°.

Here, when the incident angle φ of the light with respect to the photodetector is set to 90°, there may be a case where the return light reflected from the light incident face raises a problem. In such case, it is preferred to set the incident angle with respect to the photodetector within a range of angle where the reflected return light is satisfactorily reduced and the polarization dependence of the transmittance of the light is negligible.

Figure 7A:
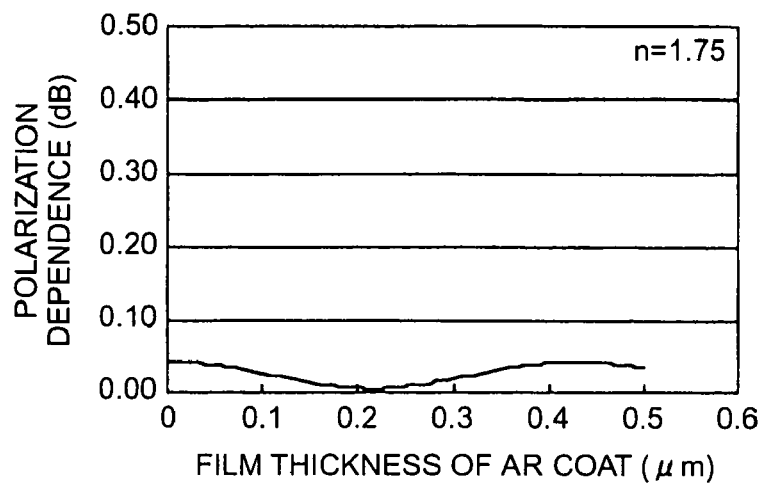
FIG. 7A–FIG. 7C are graphs each showing a change of light transmittance having polarization dependence with respect to the film thickness of an AR coat at light incident face.
Figure 7B:
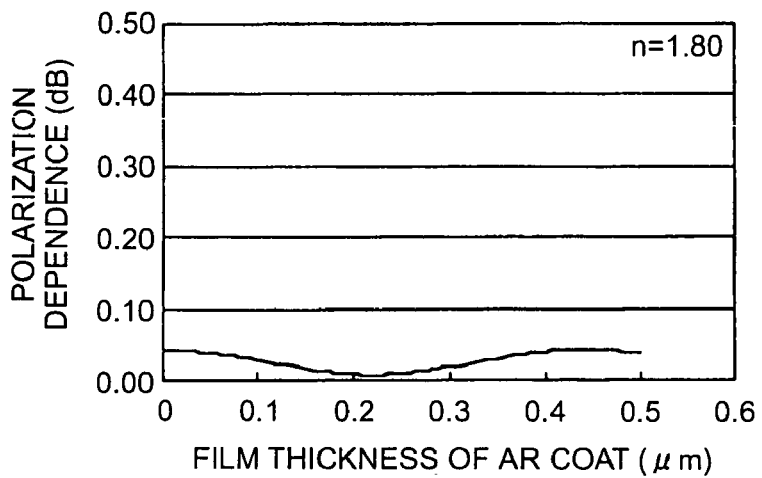
Figure 7C:
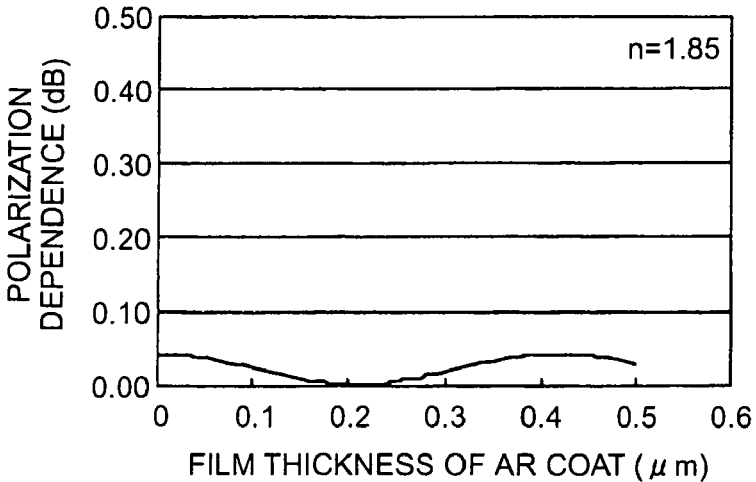

FIGS. 7A–7C are graphs showing the changes of the polarization dependence in the transmittance of light at the light incident face depending on the film thickness of the AR coat. In the graphs in FIGS. 7A–7C, the abscissa axis represents the film thickness (µm) of the AR coat; the ordinate axis represents difference (dB) in transmittance between the s-wave and the p-wave, which is the polarization dependence of the transmittance of the light.

Graphs in FIGS. 7A–7C show the changes of the polarization dependence depending on the film thickness when the light with wavelength of 1.55 µm is made incident onto the light incident face at an angle of 80° with respect thereto.

Here, the refractive index n of the AR coat is (A) n=1.75, (B) n=1.80, and (C) n=1.85 respectively.

As shown in these graphs, when the incident angle is set to 80°, although the angle is deviated a little from 90°, regardless of the film thickness t and the refractive index n of the AR coat, the polarization dependence of the transmittance of the light and the changes thereof are small. Hence, as for the incident angle with respect to the photodetector within a range of angle where the reflected return light is satisfactorily reduced and the polarization dependence of the transmittance of the light is negligible, an angle of 80° or so is preferred. When the reflected return light raises no problem, an incident angle of 90° or so may be adopted. Or, the incident angle may be preferably set to an angle within a range of 80°–90°.

In the constitution of the optical waveguide module shown in FIG. 1, as for the reflection filter 4, which reflects part of the signal light, which is transmitted through the optical waveguides $2_n$ to the photodetectors $61_n$, it is preferred to employ a reflection filter by which the difference in the reflectance between the orthogonal polarized waves is compensated and each polarized signal light component is reflected with a substantially even reflectance. As a consequence, the reflectance of the signal light by the reflection filter becomes substantially constant regardless of the polarization state of the signal light, which is transmitted through the optical waveguides $2_n$. The setting of the reflectance with respect to the signal light component with each polarization state can be made, for example, with dielectric materials constituting the dielectric multi-layered filter in each layer or combination thereof, film thickness of each layer or the like.

Further, in the optical waveguide module shown in FIG. 1, a predetermined range of the inside and upper side of the groove 3 is sealed with filler resin 5, thereby the space between the reflection filter 4 and the photodetector array 60 is filled with the resin. As a consequence, end faces of the groove 3, the reflection filter 4, the light incident face 63 of the photodetector array 60 and the like are prevented from coming into contact with outer air. And thus, the stability of the end faces and the like is prevented from being degraded due to contamination for a long period of time.

Here, for the filler resin 5, by using a resin material, which has substantially the same refractive index as that of the core of the optical waveguides $2_n$, excess reflection at the boundary face or the like between the optical waveguides $2_n$ and filler resin 5 can be reduced. If not necessary, such constitution that the filler resin 5 is not employed may be adopted; or such constitution that only the inside of the groove 3 is filled with the resin may be adopted.

Figure 8:
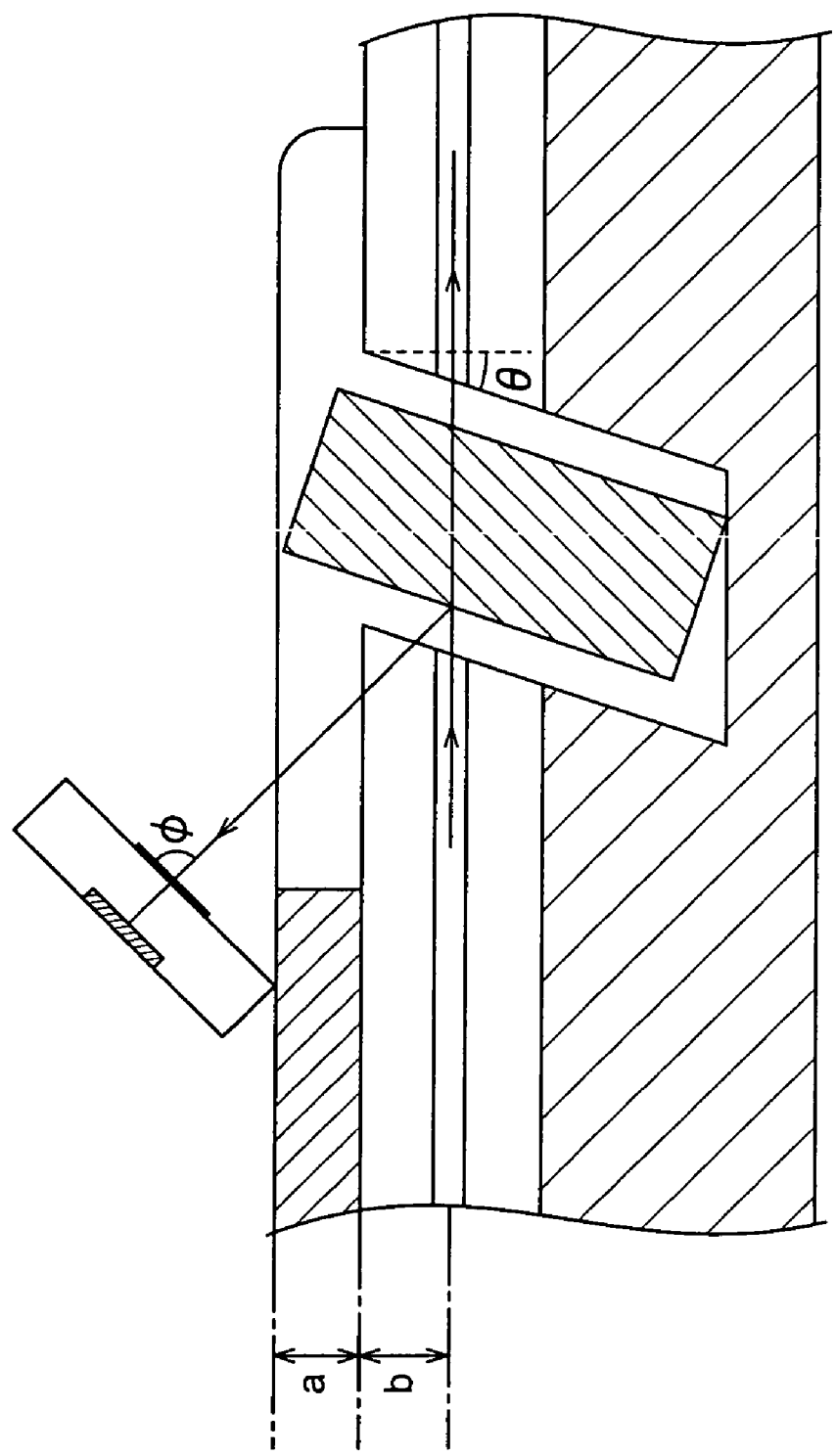
FIG. 8 is a cross sectional view showing another exemplary structure of the optical waveguide module.

Furthermore, as for the constitution for allowing the reflected light from the reflection filter to be made incident onto the light incident face of the photodetector at a predetermined angle, as shown in FIG. 8, such constitution that photodetectors are provided being inclined to the sub-mounting substrate may be adopted. However, in view of the distance between the reflection filter and the photodetectors, it is preferred to adopt such constitution that the sub-mounting substrate 70 having the structure shown in FIG. 2 is employed.

That is, as shown in FIG. 8, in such constitution that the photodetectors are disposed being inclined on the sub-mounting substrate, the distance between the reflection position of the signal light at the reflection filter and the detection position of the reflected light at the photodetectors becomes longer. In this case, the reflected light from the reflection filter to the photodetectors expands too widely. As a result, the detection performance such as photosensitivity of the reflected light with the photodetectors and cross talk between the adjacent channels are degraded.

For example, it is assumed that the thickness of is the sub-mounting substrate is a=125 μm (refer to FIG. 8); the thickness (thickness of the upper clad) from the center of the core to the top surface in the planar optical waveguide type optical circuit is b=30 μm; and the inclination angle of the reflection filter is θ=15°. In this case, when the photodetectors are disposed parallel to the planar optical waveguide type optical circuit as shown in FIG. 3, the distance between the reflection position and the detection position becomes 710 μm. On the other hand, when the photodetectors are disposed being inclined as shown in FIG. 8 the distance between the reflection position and the detection position is as large as 1310 μm and longer than in the case of parallel disposition. Accordingly, the detection performance of reflected light with the photodetectors is degraded. To be more specific, in the constitution shown in FIG. 8, the photosensitivity of reflected light with the photodetectors degrades by approximately 10 dB. Also, the cross talk between the adjacent channels degrades by approximately 3 dB.

On the other hand, according to the constitution in which the photodetector array 60 is disposed being inclined using the sub-mounting substrate 70 as shown in FIG. 2, under the same conditions, the distance between the reflection position and the detection position becomes as 610 μm. Compared to the case of the parallel disposition on the sub-mounting substrate, the distance becomes shorter. Accordingly, in addition to the reduction of the polarization dependence of the photosensitivity, the detection performance of the reflected light such as photosensitivity and cross talk is also increased. However, in the case where the degradation of the detection performance due to the distance between the reflection position and the detection position is within a level that raises no problem, the constitution as shown in FIG. 8 may be adopted.

Figure 9:
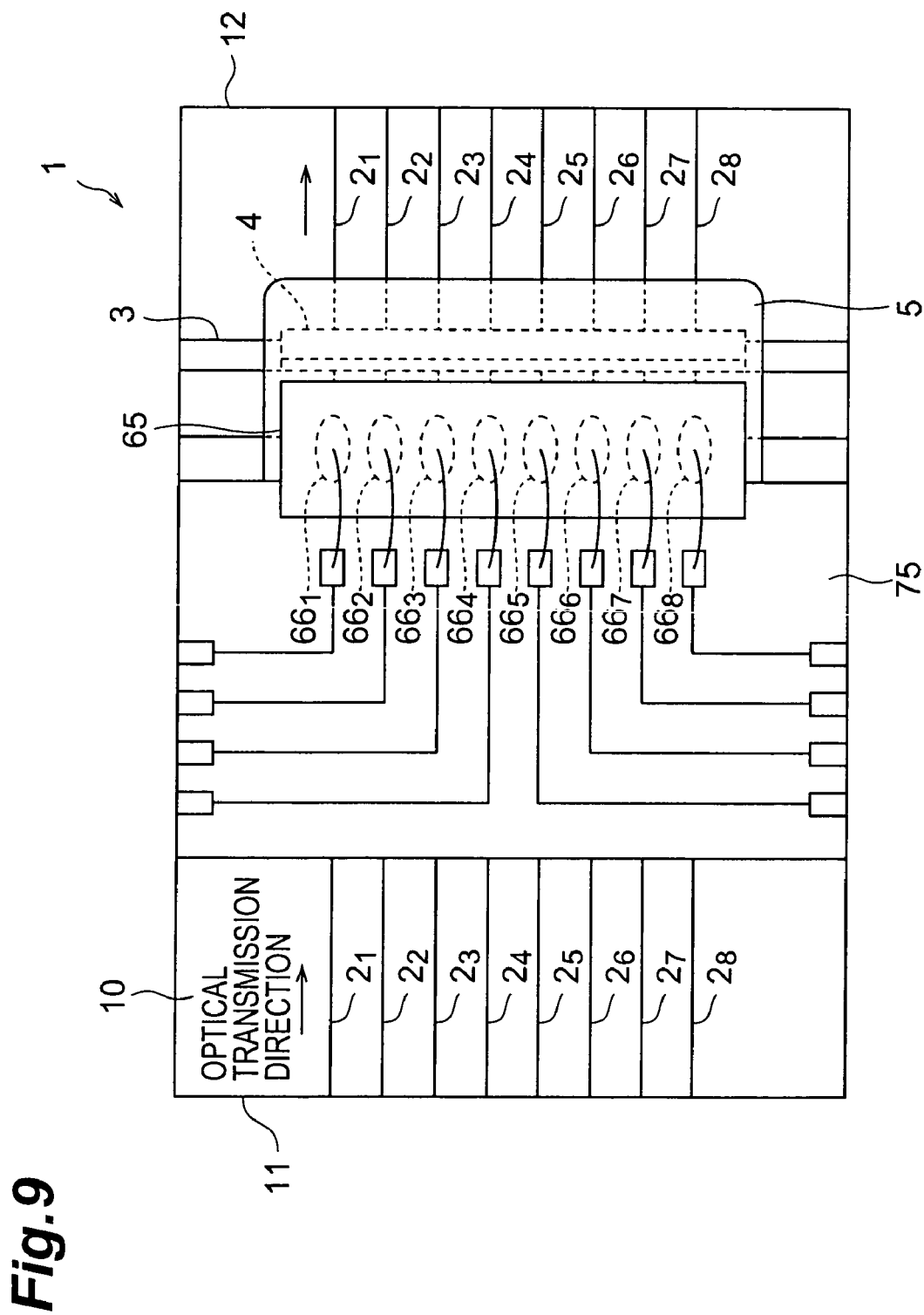
FIG. 9 is a plan view showing a structure of the optical waveguide module in accordance with a second-embodiment.

FIG. 9 is a plan view showing a constitution according to a second embodiment of the optical waveguide module. As is the case with the first embodiment, the optical waveguide module includes a planar optical waveguide type optical circuit 1 constituted of a substrate 10 and 8 optical waveguides $2_1$–$2_8$ of a planar optical waveguide type formed on the substrate 10.

Each of the optical waveguides $2_1$–$2_8$ is formed parallel to each other at regular intervals along the predetermined optical transmission direction (in the direction of the arrowhead in FIG. 9) from the input end 11 toward the output end 12 of the planar optical waveguide type optical circuit 1. In the predetermined portion with respect to the optical transmission direction of the planar optical waveguide type optical circuit 1, a groove 3, which crosses the optical waveguides $2_1$–$2_8$, is formed.

Inside the groove 3, the reflection filter 4 for reflecting part of the signal light, which is transmitted through each of the optical waveguides $2_1$–$2_8$, with a predetermined reflectance is disposed. In this embodiment, the filler resin 5 seals the inside of the groove 3. Also, at a position further upstream than the groove 3, on the top side of the planar optical waveguide type optical circuit 1, a sub-mounting substrate 75 is disposed. And in the upper portion of the filler resin 5 and sub-mounting substrate 75, a photodetector array 65 is disposed. The photodetector array 65 has eight photodetectors $66_1$–$66_8$ corresponding to each of the eight optical waveguides $2_1$–$2_8$ in the planar optical waveguide type optical circuit 1.

In FIG. 9, with respect to the photodetectors $66_1$–$66_8$, the shape of each light receiving surface is indicated with a dotted line. Also, as schematically shown in FIG. 9, formed on the top surface of the sub-mounting substrate 75 are wirings, electrodes and the like for reading light detection signals from the photodetectors $66_1$–$66_8$.

Figure 10:
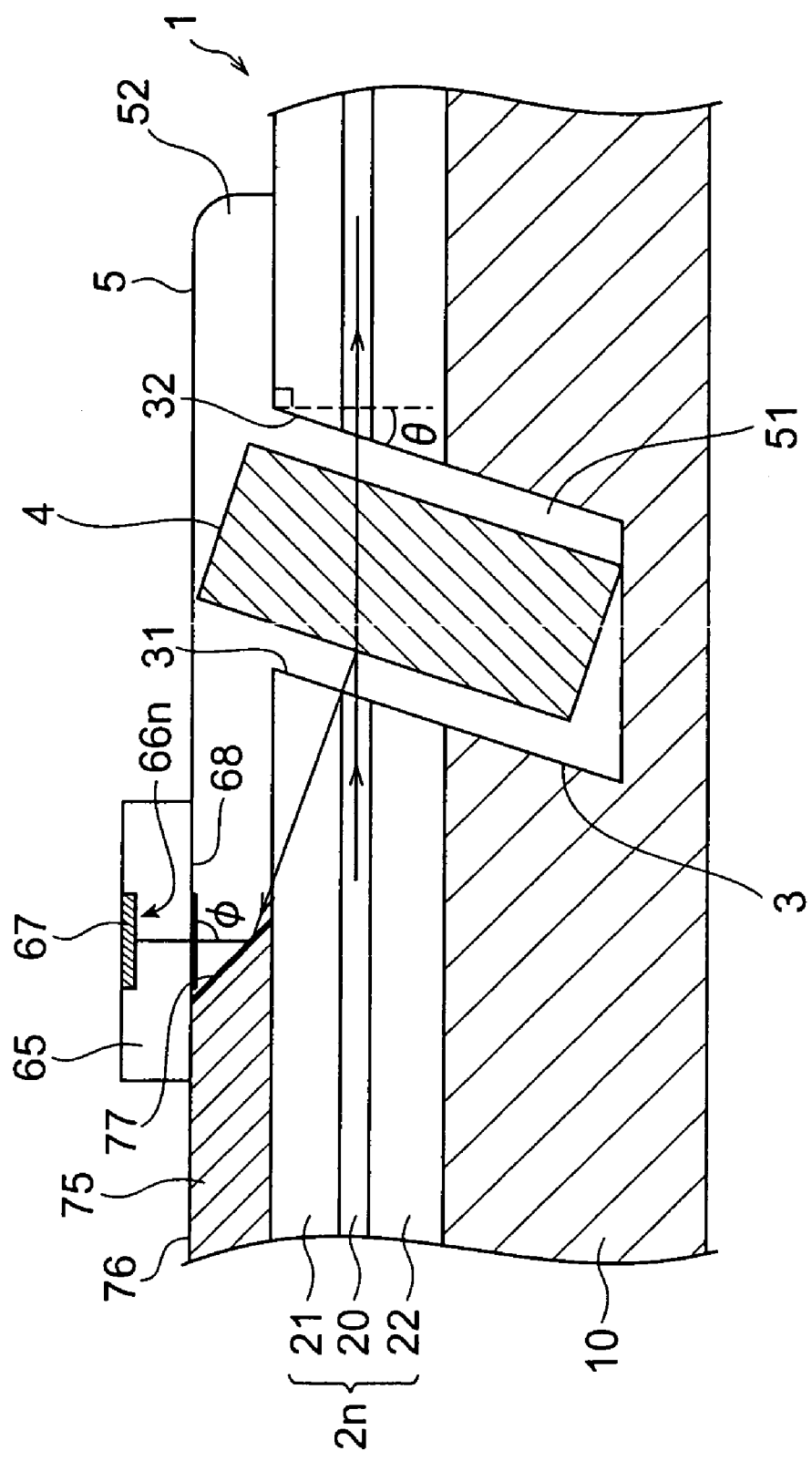
FIG. 10 is a cross sectional view showing a partially enlarged structure of cross section along the optical axis of the optical waveguide module shown in FIG. 9.

FIG. 10 is a cross sectional view showing the cross sectional structure of the optical waveguide module shown in FIG. 9 along the direction of the optical axis of the optical waveguides $2_n$ (n=1–8). In FIG. 10, a portion including the groove 3, the reflection filter 4 and the photodetector array 65 is shown enlarged. Also, in the constitution shown in FIG. 10, as for the planar optical waveguide type optical circuit 1 including the optical waveguides $2_n$, which is comprised of the lower clad 22, the core 20 and the upper clad 21, the groove 3, the reflection filter 4 and the filler resin 5, the constitution thereof is the same as the constitution shown in FIG. 2.

On the top side of the upper clad 21 in the planar optical waveguide type optical circuit 1, a sub-mounting substrate 75 is disposed. The sub-mounting substrate 75 is a mounting member for mounting the photodetector array 65, and one face thereof is the photodetector mounting face 76 for mounting the photodetector array 65, which includes the photodetectors 66, (n=1–8) corresponding to each of the optical waveguides $2_n$. The photodetector array 65 is disposed on the top surface of the photodetector mounting face 76 and the upper filler resin portion 52 reflection filter 4, which is part of the signal light transmitted through the optical waveguides $2_n$, is made incident onto each of the corresponding light receiving portion 67 of the photodetectors $66_n$.

The sub-mounting substrate 75 is fixed to the top surface of the planar optical waveguide type optical circuit 1 parallel to the optical circuit 1 via the face opposite to the photodetector mounting face 76. As a consequence, as is the case with the sub-mounting substrate 75, the photodetector array 65 mounted on the photodetector mounting face 76 is constituted being disposed parallel to the optical circuit 1.

In the example of the constitution shown in FIG. 10, as for the photodetectors $66_n$ for the photodetector array 65, a rear-face incident type photodiode is employed. The rear-face of the photodetector array 65 at the sub-mounting substrate 75 and the upper filler resin portion 52 side, which is opposite to the surface on which a light receiving portion 67 of the photodetectors $66_n$ is formed, is the light incident face 68 for the reflected light from the reflection filter 4.

Also, on the light incident face 68 of the photodetectors $66_n$, an anti-reflection coat (AR coat), which is a coat film for preventing the reflection of light within a predetermined wavelength band corresponding to the wavelength band of the signal light transmitted through the optical waveguides $2_n$, is formed.

Further, the down stream side face adjacent to the photodetector mounting face 76 of the sub-mounting substrate 75 is formed being inclined at a predetermined angle with respect to the top surface of the planar optical waveguide type optical circuit 1; and on the surface thereof, a reflection mirror 77 is formed. The reflection mirror 77 is an optical path changing means for changing the light path of the reflected light from the reflection filter 4 to a light path, which is made incident onto the light incident face 68 of the photodetectors 66, at a predetermined angle with respect thereto.

In the above-described constitution, when the signal light, which is transmitted through the optical waveguides $2_n$, is output to the inner filler resin portion 51 in the groove 3 via the upstream end face 31, part of the signal light is reflected by the reflection filter 4, which is inclined with respect to the optical axis, obliquely toward the upper portion of the planar optical waveguide type optical circuit 1 with a predetermined reflectance. Also, the rest of the component of the signal light passes through the inner filler resin portion 51 and reflection filter 4, and is made incident onto the optical waveguides $2_n$ via the downstream end surface 32.

On the other hand, the reflected light, which is reflected by the reflection filter 4, passes through the inner filler resin portion 51, the optical waveguides $2_n$ and the upper filler resin portion 52, and is reflected by the reflection mirror 77 formed on the surface of the sub-mounting substrate 75; thus the light path is changed. The reflected light, of which light path has been changed by the reflection mirror 77, reaches the photodetector array 65 via the upper filler resin portion 52, and is made incident onto the photodetectors $66_n$ via the light incident face 68 at a predetermined incident angle $\phi$. Thus, based on the optical intensity of the reflected light, which is detected by the light receiving portion 67 of the photodetectors $66_n$, the optical intensity of the signal light, which is transmitted through the optical waveguides $2_n$, is monitored.

Effects of the optical waveguide module according to this embodiment will be described.

In the optical waveguide module shown in FIG. 9 and FIG. 10, as is the case with the optical waveguide module shown in FIG. 1 and FIG. 2, the following constitution is adopted. That is, the optical waveguide is not split by optical coupler, but part of the signal light is reflected by the reflection filter 4 disposed in the inclined groove 3 formed on the optical waveguides $2_n$; and based on the reflected light, the optical intensity of the signal light is monitored. As a consequence, the constitution and manufacturing process of the optical circuit is simplified.

Also, such constitution is adopted; i.e., the reflected light from the reflection filter 4 is made incident onto the light incident face 68 of the photodetectors 66, in the photodetector array 65 at a predetermined angle. At this time, the polarization dependence of the light, which passes through the light incident face 68, is reduced. Accordingly, the photosensitivity of the reflected light at the photodetectors 66 can be kept constant regardless of the polarization state of the signal light. As a consequence, it is made possible to correctly monitor the optical intensity regardless of the polarization state of the signal light. The setting of the incident angle $\phi$ of the reflected light with respect to the light incident face 68 of the photodetectors $66_n$ is the same as the setting described above with respect to the first embodiment. As for the photodetector for the photodetector array, a front-face incident type photodetector may be used.

Further, in the optical waveguide module shown in FIG. 9, as a constitution in which the reflected light is allowed to be made incident onto the light incident face 68 of the photodetectors 66, at a predetermined angle with respect thereto, the following constitution is adopted. That is, the reflection mirror 77, which is an optical path changing means, is formed on a predetermined surface of the sub-mounting substrate 75; thereby the reflected light from the reflection filter 4 is reflected by the reflection mirror 77 to change the light path.

By using the optical path changing means as described above, the light path itself of the reflected light can be changed. Accordingly, the photodetector array 65 including photodetectors $66_n$ does not have to be inclined with respect to the top surface of the planar optical waveguide type optical circuit 1. Thus, such constitution that the light path of the reflected light and the light incident face 68 of the photodetectors $66_n$ form a predetermined angle can be obtained.

Also, in the constitution employing the optical path changing means, it is possible to reduce the distance from the reflection filter 4 to the photodetectors $66_n$. As a consequence, the detection performance such as the photosensitivity and the cross talk at the photodetectors $66_n$ is increased.

For example, it is assumed that the thickness of the sub-mounting substrate is a=125 μm (refer to FIG. 8); the thickness from the core center to the top surface (thickness of the upper clad) in the planar optical waveguide type optical circuit is b=30 μm; the inclination angle of the reflection filter is $\theta=15°$; and the incident angle $\phi$ is 90° (the angle formed by the reflection mirror 77 with respect to the top surface of the planar optical waveguide type optical circuit 1 is approximately 30°). Here, as shown in FIG. 10, according to the constitution in which the reflection mirror 77 as the optical path changing means is provided, the distance between the reflection position of the signal light in the reflection filter 4 and the detection position of the reflected light in the photodetectors 66, is 430 μm. Accordingly, compared to the constitution shown in FIG. 3 and FIG. 8, the distance is shorter. Accordingly, in addition to reduced polarization dependence on the photosensitivity, there is achieved improvement in the detection performance of the reflected light such as the photosensitivity and cross talk.

As for the reflection mirror 77 formed on a predetermined surface of the sub-mounting substrate 75, a total reflection mirror, which is formed with total reflection coating corresponding to the incident angle of the light, is preferred. In this case, the polarization dependence of the reflected light, which is made incident onto the photodetectors $66_n$, can be further reduced. Further, as for the optical path changing means, a means other than the reflection mirror formed on the surface of the sub-mounting substrate, which is the mounting member therefore, may be used.

Figure 11:
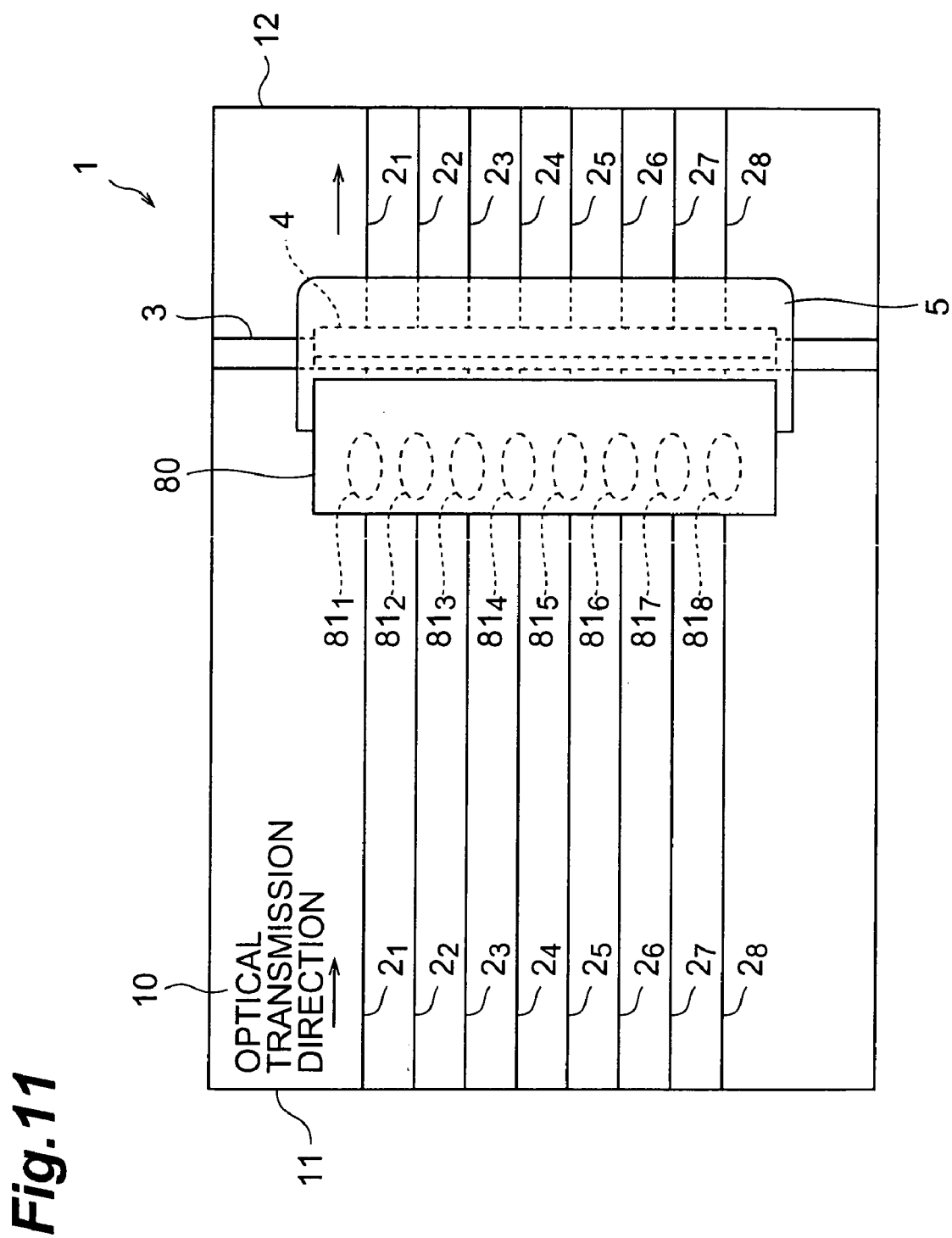
FIG. 11 is a plan view showing a structure of the optical waveguide module in accordance with a third embodiment.

FIG. 11 is a plan view showing a constitution according to a third embodiment of the optical waveguide module. As is the case with the first embodiment, this optical waveguide module includes a planar optical waveguide type optical circuit 1 constituted of a substrate 10 and 8 optical waveguides $2_1$–$2_8$ of a planar optical waveguide type, which are formed on the substrate 10.

Each of the optical waveguides $2_1$–$2_8$ are formed parallel to each other at regular intervals along the predetermined optical transmission direction (in the direction of the arrowhead in FIG. 11) from the input end 11 toward the output end 12 of the planar optical waveguide type optical circuit 1. In the predetermined portion with respect to the optical transmission direction of the planar optical waveguide type optical circuit 1, a groove 3 across the optical waveguides $2_1$–$2_8$ is formed.

In the groove 3, the reflection filter 4 for reflecting part of the signal light, which is transmitted through each of the optical waveguides $2_1$–$2_8$, with a predetermined reflectance is disposed. In this embodiment, the filler resin 5 seals the inside of the groove 3. Also, at a position in the upstream side upper than the groove 3, on the top side of the planar optical waveguide type optical circuit 1, a photodetector array 80 is disposed. The photodetector array 80 has eight photodetectors $81_1$–$81_8$ corresponding to each of the eight optical waveguides $2_1$–$2_8$ in the planar optical waveguide type optical circuit 1.

In FIG. 11, with respect to the photodetectors $81_1$–$81_8$, the shape of each light receiving surface is indicated with a dotted line.

Figure 12:
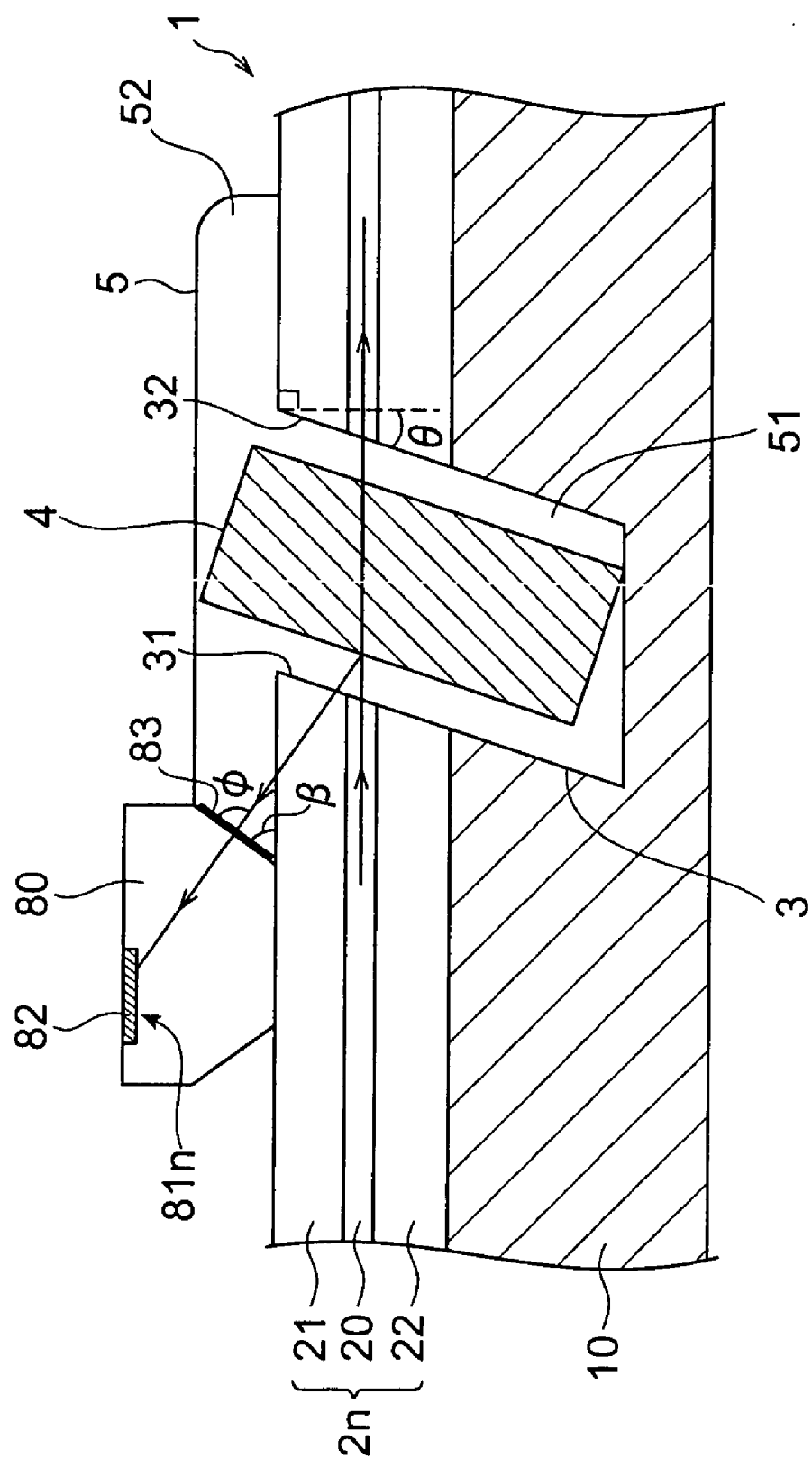
FIG. 12 is a cross sectional view showing a partially enlarged structure of cross section along the optical axis of the optical waveguide module shown in FIG. 11.

FIG. 12 is a cross sectional view showing the cross sectional structure of the optical waveguide module shown in FIG. 11 along the direction of the optical axis of the optical waveguides $2_n$ (n=1–8). In FIG. 12, a portion including the groove 3, the reflection filter 4 and the photodetector array 80 is shown enlarged. Also, in the constitution shown in FIG. 12, the planar optical waveguide type optical circuit 1 including the optical waveguides $2_n$, which is comprised of the lower clad 22, the core 20 and the upper clad 21, the groove 3, the reflection filter 4 and the filler resin 5 are the same as the constitution shown in FIG. 2.

Disposed on the top side of the upper clad 21 in the planar optical waveguide type optical circuit 1 is a photodetector array 80 having photodetectors $81_n$ (n=1–8) corresponding to each of the optical waveguides $2_n$. The photodetector array 80 is disposed on the top surface of the planar optical waveguide type optical circuit 1 such that the reflected light reflected by the reflection filter 4, which is part of the signal light transmitted through the optical waveguides $2_n$, is made incident onto each of the corresponding light receiving portions 82 of the photodetectors $81_n$.

In the example of the constitution shown in FIG. 12, as for the photodetectors $81_n$ of the photodetector array 80, a rear-face incident type photodiode is used. On the surface of the photodetector array 80 opposite to the planar optical waveguide type optical circuit 1, the light receiving portion 82 of the photodetectors $81_n$ is formed. Also, in the downstream side face of the photodetector array 80, a portion of the face adjacent to the rear-face and near the planar optical waveguide type optical circuit 1 is obliquely formed at an angle $\beta$ (0°<$\beta$<90°) with respect to the top surface of the planar optical waveguide type optical circuit 1; and this face portion is the light incident face 83 for the reflected light from the reflection filter 4. As shown in FIG. 12, the angle $\beta$ is set such that the reflected light from the reflection filter 4 is made incident onto the light incident face 83 of the photodetectors $81_n$ at a predetermined angle $\phi$.

Also, on the light incident face 83 of the photodetectors $81_n$, an anti-reflection coat (AR coat), which is a coat film for preventing the reflection of light within a predetermined wavelength band corresponding to the wavelength band of the signal light transmitted through the optical waveguides $2_n$, is formed.

In the constitution as described above, when the signal light, which is transmitted through the optical waveguides $2_n$, is output to the inner filler resin portion 51 in the groove 3 via the upstream end surface 31, by the reflection filter 4, which is inclined with respect to the optical axis, part of the signal light is reflected obliquely toward the upper portion of the planar optical waveguide type optical circuit 1 with a predetermined reflectance. The other component of signal light passes through the inner filler resin portion 51 and the reflection filter 4 and is made incident onto the optical waveguides $2_n$ again via the downstream end surface 32.

On the other hand, the reflected light reflected by the reflection filter 4 reaches the photodetector array 80 through the inner filler resin portion 51, the optical waveguides $2_n$, and the upper filler resin portion 52, and is made incident onto the photodetectors $81_n$ through the light incident face 83 at a predetermined incident angle $\phi$. And based on the optical intensity of the reflected light, which is detected by the light receiving portion 82 in the photodetectors $81_n$, the optical intensity of the signal light, which is transmitted through the optical waveguides $2_n$, is monitored.

Effects of the optical waveguide module according to this embodiment will be described.

In the optical waveguide module shown in FIG. 11 and FIG. 12, as is the case with the optical waveguide module shown in FIG. 1 and FIG. 2, the following constitution is adopted. That is, the optical waveguide is not split by optical coupler, but part of the signal light is reflected by the reflection filter 4 disposed in the inclined groove 3 formed on the optical waveguides $2_n$, and based on the reflected light, the optical intensity of the signal light can be monitored. As a consequence, the constitution and manufacturing process of the optical circuit is simplified.

Also, such constitution that the reflected light from the reflection filter 4 is made incident onto the light incident face 83 of the photodetectors $81_n$ in the photodetector array 80 at a predetermined angle with respect thereto is adopted. Here, the polarization dependence of the light, which passes through the light incident face 83, is reduced. Accordingly, the photosensitivity of the reflected light at the photodetectors $81_n$ can be kept substantially constant regardless of the polarization state of the signal light. As a consequence, it is possible to monitor the optical intensity correctly regardless of the polarization state of the signal light. The setting of the incident angle $\phi$ of the reflected light with respect to the light incident face 83 of the photodetectors $81_n$ is the same as the setting described above with respect to the first embodiment.

Furthermore, in the optical waveguide module shown in FIG. 11, as the constitution that allows the reflected light to is made incident onto the light incident face 83 of the photodetectors $81_n$ at a predetermined angle with respect thereto, the following constitution is adopted. That is, the photodetector array 80 is disposed on the top surface of the planar optical waveguide type optical circuit 1, and the light incident face 83 is formed at an inclined angle $\beta$ (0°<$\beta$<90°) with respect to the top surface of the planar optical waveguide type optical circuit 1.

As described above, by employing such constitution that the light incident face 83 of the photodetectors $81_n$ is inclined, by using a smaller number of parts, it is possible to obtain such constitution that the light path of the reflected light and the light incident face 83 of the photodetectors $81_n$ form a predetermined angle. Also, by reducing the number of parts, the manufacturing process can be simplified.

Also, in the constitution in which the light incident face is inclined, the distance from the reflection filter 4 to the photodetectors $81_n$ can be reduced. As a consequence, the detection performance such as the photosensitivity at the photodetectors $81_n$ and the cross talk is increased.

For example, it is assumed that the thickness (thickness of the upper clad) from the core center to the top surface in the planar optical waveguide type optical circuit is b=30 μm (refer to FIG. 8); the thickness of the photodetector array 80 is 200 μm; and the inclination angle of the reflection filter is $\theta$=15°. In this case, according to the constitution in which the light incident face 83 of the photodetector array 80 is inclined as shown in FIG. 12, the distance between the reflection position of the signal light in the reflection filter 4 and the detection position of the reflected light in the photodetectors $81_n$ is 460 μm. Compared to the constitution shown in FIG. 3 and FIG. 8, the distance is reduced. Accordingly, in addition to the reduction of polarization dependence in the photosensitivity, the detection performance of the reflected light such as the photosensitivity and the cross talk is also increased.

As for the light receiving portion 82 in the photodetectors $81_n$, viewed from the light path of the reflected light, it is preferred that the same is disposed in a position opposite to the light incident face 83. As a consequence, the reflected light from the reflection filter 4, which is made incident onto the light incident face 83, can be detected effectively.

Figure 13:
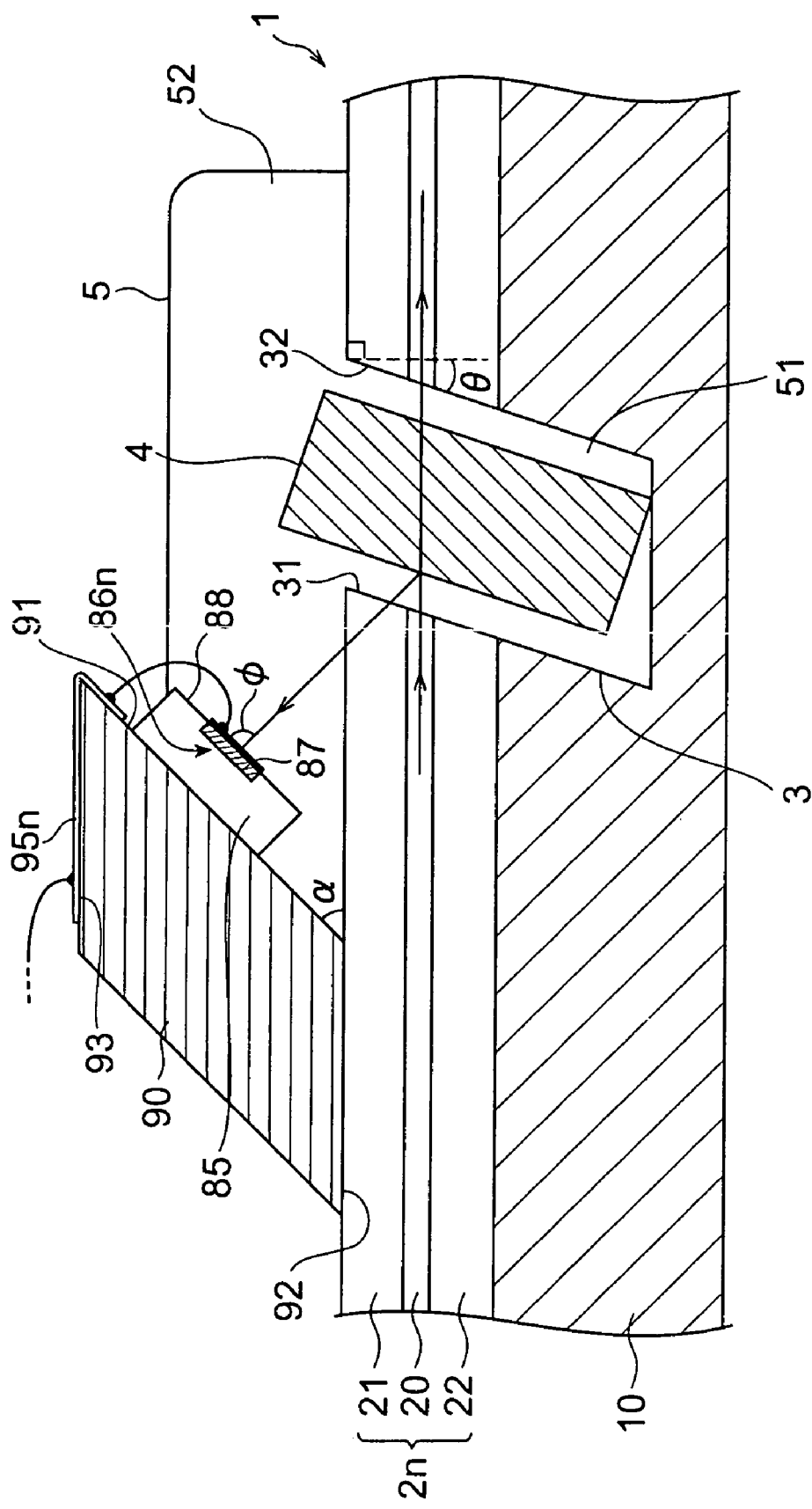
FIG. 13 is a cross sectional view showing a partially enlarged structure of cross section along the optical axis of the optical waveguide module in accordance with a fourth embodiment.

FIG. 13 is a cross sectional view showing a structure of cross section of the optical waveguide module according to a fourth embodiment along the direction of the optical axis of an optical waveguides $2_n$ (n=1–8). In FIG. 13, a portion including a groove 3, a reflection filter 4 and photodetector array 85 is shown enlarged. Also, in the constitution shown in FIG. 13, the planar optical waveguide type optical circuit 1 including optical waveguides $2_n$ comprised of the lower clad 22, the core 20 and the upper clad 21, the groove 3, the reflection filter 4 and the filler resin 5 are the same as those in the constitution in FIG. 2.

The optical waveguide module according to this embodiment has almost the same constitution as that of the first embodiment shown in FIG. 1 and FIG. 2. Hence, in this embodiment, the plan view is omitted. To be more specific, the optical waveguide module according to this embodiment is different from the first embodiment in the constitution of the sub-mounting substrate or the like.

Disposed on the top side of the upper clad 21 of the planar optical waveguide type optical circuit 1 is a sub-mounting substrate 90. The sub-mounting substrate 90 is a mounting member for mounting a photodetector array 85, and one face thereof is a photodetector mounting face 91 for mounting the photodetector array 85 having photodetectors 86, (n=1–8) corresponding to each of the optical waveguides $2_n$. The photodetector array 85 is disposed on the photodetector mounting face 91 such that the reflected light of part of the signal light transmitted through the optical waveguides $2_n$, which is reflected by the reflection filter 4, is made incident onto the light receiving portion 87 of the corresponding photodetectors $86_n$.

The sub-mounting substrate 90 is fixed to the top surface of the planar optical waveguide type optical circuit 1 via a substrate fixing face 92, which is the bottom face thereof adjacent to the photodetector mounting face 91. Also, the substrate fixing face 92 is formed so as to form an angle larger than 90° with respect to the photodetector mounting face 91. As a consequence, the photodetector mounting face 91 is set so as to be inclined at an angle $\alpha$ (0°<$\alpha$<90°) with respect to the top surface of the planar optical waveguide type optical circuit 1. The angle $\alpha$ is set referring to the light path of the reflected light from the reflection filter 4.

In the example of constitution shown in FIG. 13, as the photodetectors $86_n$ of the photodetector array 85, a front-face incident type photodiode is employed. The surface of the photodetector array 85, in which the light receiving portion 87 of the photodetectors $86_n$ is provided on the side opposite to the sub-mounting substrate 90, is the light incident face 88 for the reflected light from the reflection filter 4. The angle $\alpha$, which is formed by the photodetector mounting face 91 and the top surface of the planar optical waveguide type optical circuit 1 is so set that, as shown in FIG. 13, the reflected light from the reflection filter 4 is made incident onto the light incident face 88 in the photodetectors 86, at a predetermined angle (angle $\phi$ in FIG. 13) with respect thereto.

Also, on the light incident face 88 of the photodetectors $86_n$, an anti-reflection coat (AR coat), which is a coat film for preventing the reflection of light within a predetermined wavelength band corresponding to the wavelength band of the signal light transmitted through the optical waveguides $2_n$, is formed.

Figure 14A:
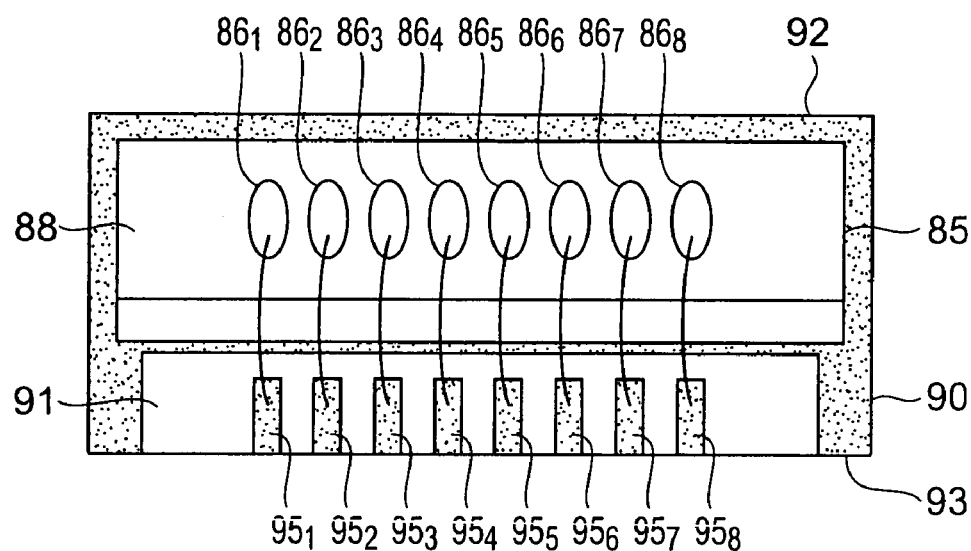
FIG. 14A and FIG. 14B are (A) a side view viewed from the downstream side, and (B) a top view, respectively, showing a structure of a sub-mounting substrate and a photodetector array in the optical waveguide module shown in FIG. 13.
Figure 14B:
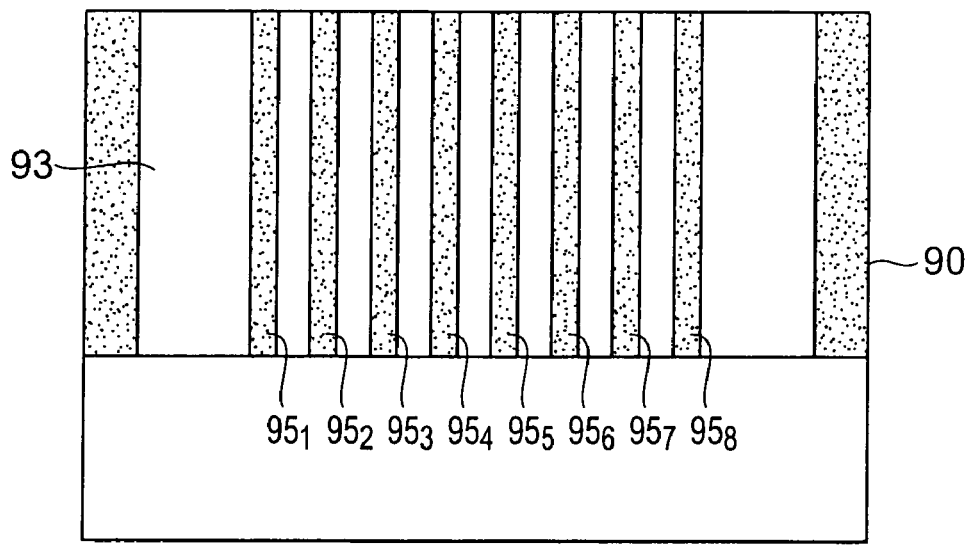

FIG. 14A is a side view showing the constitution of the sub-mounting substrate 90 and the photodetector array 85 in the optical waveguide module shown in FIG. 13 viewed from the downstream side; and FIG. 14B is a top view thereof.

In this embodiment, as shown in FIG. 13, FIG. 14A and FIG. 14B, the top surface of the sub-mounting substrate 90, which neighbors the photodetector mounting face 91 and is parallel with the substrate fixing face 92 and the top surface of the planar optical waveguide type optical circuit 1, is the wiring face 93. And disposed on the wiring face 93 and the photodetector mounting face 91, on which the photodetector array 85 is mounted, are eight wirings $95_1$–$95_8$ extending from the photodetector mounting face 91 to the wiring face 93 (refer to FIG. 13).

As shown in FIG. 14A, each of the wirings $95_1$–$95_8$ are electrically connected to eight corresponding photodetectors $86_1$–$86_8$ on the photodetector array 85. As a consequence, the wirings $95_n$ (n=1–8) have such constitution so as to be used as the signal lines for reading light detection signals from the photodetectors $86_n$.

Effects of the optical waveguide module according to this embodiment will be described.

In the optical waveguide module shown in FIG. 13, FIG. 14A and FIG. 14B, in addition to the constitution of the optical waveguide module shown in FIG. 1 and FIG. 2, on the sub-mounting substrate 90 for mounting the photodetector array 85 thereon, three dimensional wirings $95_1$–$95_8$ for reading the light detection signals from the photodetectors $86_1$–$86_8$ are formed.

Ordinarily, to read light detection signals from photodiodes as the photodetector, there is a need to lay a wiring between the anode electrodes of the photodiodes and the corresponding wirings provided to a wiring substrate or lead frame to electrically connect the electrodes and wirings. Here, like the optical waveguide module shown in FIG. 1 and FIG. 2, when the photodetector array is disposed being inclined with respect to the planar optical waveguide type optical circuit, the surface on which the electrodes of the photodetector array are provided becomes inclined with respect to the wiring face such as wiring substrate, which is parallel with the planar optical waveguide type optical circuit. In such case, there may be a case where the wiring between the electrodes and wirings is hardly laid.

Contrarily, in the optical waveguide module according to the embodiment, the top surface of the sub-mounting substrate 90, which is parallel with respect to the top surface of the planar optical waveguide type optical circuit 1, is used as the wiring face 93. And the wirings $95_1$–$95_8$ for reading light detection signals from the photodetectors $86_1$–$86_8$, which extend from the photodetector mounting face 91 to the wiring face 93, are formed.

According to the constitution as described above, the wiring portion on the photodetector mounting face 91 for the wirings $95_n$ is used for connecting to the photodetectors $86_n$; and the wiring portion on the wiring face 93, which is parallel to the wiring substrate and the like, can be used for wiring with the external wirings. As a consequence, the wiring between the anode electrodes of the photodiodes and the corresponding wirings, which are formed on the wiring substrate or the lead frame, can be made satisfactorily. Further, in the manufacturing process, a process such as wire bonding can be carried out easily.

The optical waveguide module according to the present invention is not limited to the above-described embodiments, but various modifications are possible. For example, in the above embodiments, the planar optical waveguide type optical circuit is employed as the optical circuit. As for the optical circuit, as described above, it is not limited to the planar optical waveguide type optical circuit. An optical circuit, in which part or the entire optical circuit portion is constituted by using an optical fiber, may be employed.

Figure 15A:
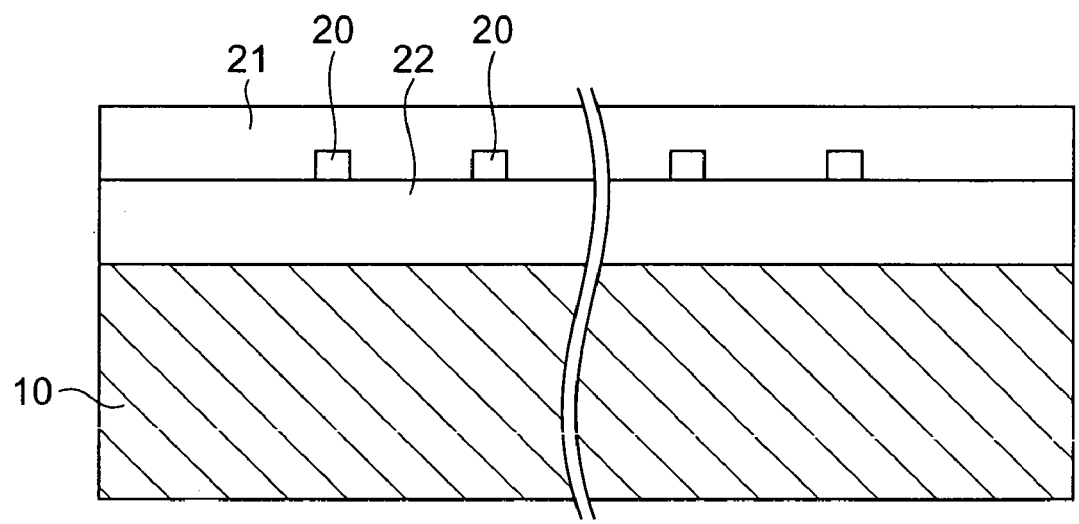
FIG. 15A and FIG. 15B are cross sectional views each showing a structure of cross section perpendicular to the optical axis of an optical circuit.
Figure 15B:
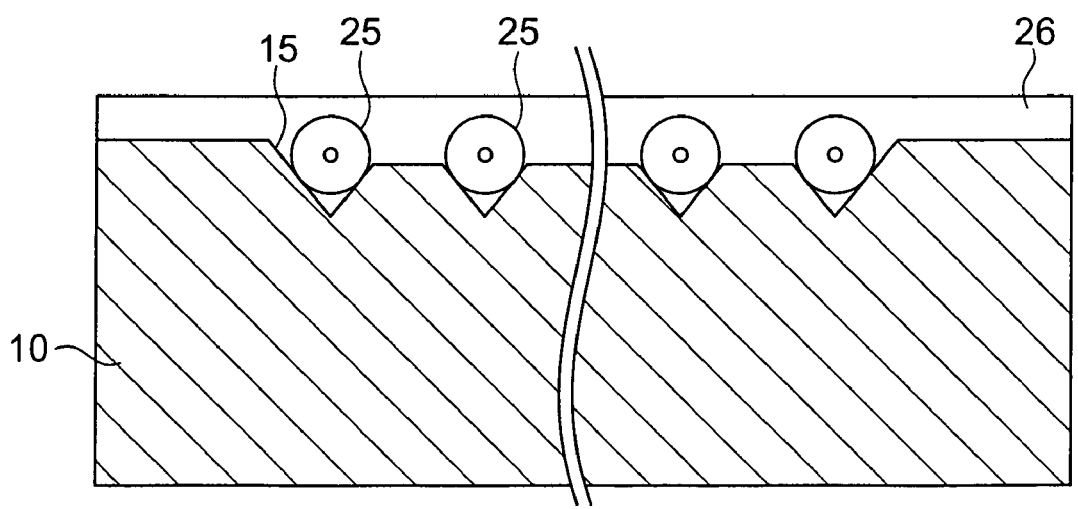

FIG. 15A and FIG. 15B are cross sectional views respectively showing the structure of cross section of the optical waveguide module along the direction perpendicular to the optical axis of the optical waveguide. FIG. 15A shows the structure of cross section of the optical circuit in the case where an optical waveguide of planar optical waveguide type is employed as the optical waveguide. This is equivalent to the structure of cross section perpendicular to the optical axis of the optical waveguide module shown in FIG. 1 and FIG. 2. Also, FIG. 15B shows the structure of cross section of an optical circuit in the case where an optical fiber is employed in place of the optical waveguide of planar optical waveguide type is employed as the optical waveguide.

The optical circuit shown in FIG. 15A is, as described above with respect to FIG. 2, constituted of an optical waveguide of planar optical waveguide type in which the lower clad 22, the core 20 and the upper clad 21 are formed on the substrate 10.

On the other hand, in the optical circuit shown in FIG. 15B, on the top surface of the substrate 10, V-grooves 15, which functions as optical fiber disposing member, are formed parallel to each other and at regular intervals. In each of the plural V-grooves 15, optical fibers 25, which is comprised of a core and a clad, are fixed thereto; thereby the optical circuit in which optical fibers 25 as the optical waveguide are disposed on the substrate 10 is constituted. Also, in this constitution, in order to fix the optical fibers 25 disposed in the V-grooves 15, a fiber fixing resin 26, which covers the top surface of the substrate 10 and the optical fibers 25, is provided.

As described above, as for the optical circuit in which a groove for inserting the reflection filter is formed, it is not limited to the optical circuit, which is constituted by using optical waveguide of planar optical waveguide type employed as the optical waveguide shown in FIG. 15A, but the optical circuit, which is constituted by employing an optical fiber as the optical waveguide as shown in FIG. 15B may be used.

Also, in the embodiment shown in FIG. 11 and FIG. 12, such constitution that, by using the photodetector array 80 of rear-face incident type, and by forming part of the side face thereof at the downstream side being inclined at angle β to form the light incident face 83, is shown. As described above, as for the constitution in which the light incident face of the photodetector array is inclined at a predetermined angle with respect to the top surface of the planar optical waveguide type optical circuit, in addition to the above-described constitution or the constitution using the mounting member shown in FIG. 1 and FIG. 2, various constitutions are possible.

Figure 16:
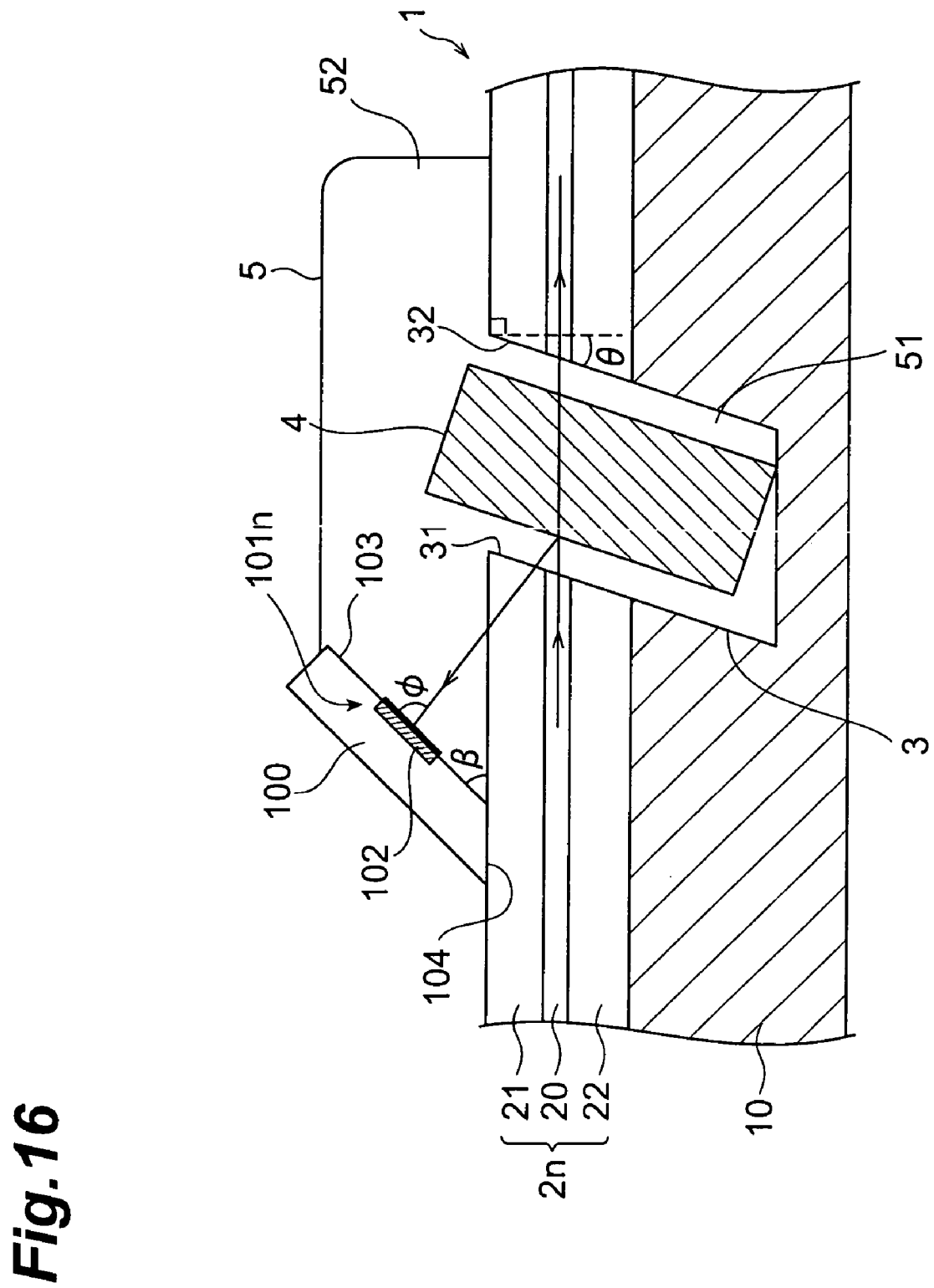
FIG. 16 is a cross sectional view showing a partially enlarged structure of cross section along the optical axis of the optical waveguide module in accordance with another embodiment.

FIG. 16 is a cross sectional view showing the structure of cross-section along the optical axis as another embodiment of the optical waveguide module. The constitution of the optical waveguide module according to this embodiment is the same as the constitution shown in FIG. 12 excluding the photodetector array.

Provided to the top side of the upper clad 21 in the planar optical waveguide type optical circuit 1 is a photodetector array 100, which has photodetectors $101_n$ (n=1–8) corresponding to each of the optical waveguides $2_n$. The photodetector array 100 is disposed on the top surface of the planar optical waveguide type optical circuit 1 such that the reflected light reflected by the reflection filter 4, which is part of the signal light transmitted through the optical waveguides $2_n$, is made incident onto the light receiving portion 102 of the corresponding photodetectors $101_n$.

In the example of the constitution shown in FIG. 16, as the photodetectors $101_n$ for the photodetector array 100, a front-face incident type photodiode is employed. The surface of the photodetector array 100 formed with the light receiving portion 102 of the photodetectors $101_n$ is the light incident face 103 for the reflected light from the reflection filter 4.

The photodetector array 100 is fixed to the top surface of the planar optical waveguide type optical circuit 1 via a detector fixing face 104, which is a face adjacent to the light incident face 103. Also, the detector fixing face 104 is formed so as to form an angle larger than 90° with respect to the light incident face 103. As a consequence, the light incident face 103 is inclined at an angle of β (0°<β<90°) with respect to the top surface of the planar optical waveguide type optical circuit 1. As shown in FIG. 16, the angle β is set such that the reflected light from the reflection filter 4 is made incident onto the light incident face 103 of the photodetectors $101_n$ at a predetermined angle φ with respect thereto.

In the constitution as described above, as is the case with the constitution shown in FIG. 1 and FIG. 2, or in FIG. 11 and FIG. 12, the polarization dependence of the light, which passes through the light incident face 103, is reduced. Accordingly, the photosensitivity of the reflected light at the photodetectors $101_n$ can be set to a specific level regardless of the polarization state of the signal light. The constitution shown in FIG. 16 is applicable to the case where a rear-face incident type photodetector array is employed.

Also, in each of the above-described embodiments, as the optical waveguide in the planar optical waveguide type optical circuit, N optical waveguides are provided (N is a plural number; 8 in FIG. 1); and as the photodetector, a photodetector array, which includes N photodetectors corresponding to the N optical waveguides, is employed. As a consequence, the optical intensity of the signal light with N channels, which are transmitted through each of the N optical waveguides, can be monitored correctly regardless of the polarization state of the respective signal lights. In the case also where the optical waveguide in the planar optical waveguide type optical circuit comprises only one channel, the constitution of the above-described optical waveguide module is likewise applicable thereto.

Further, when a photodetector array, which has photodiodes with plural channels, is employed as the photodetectors, photodetector array of various constitutions may be employed.

Figure 17A:
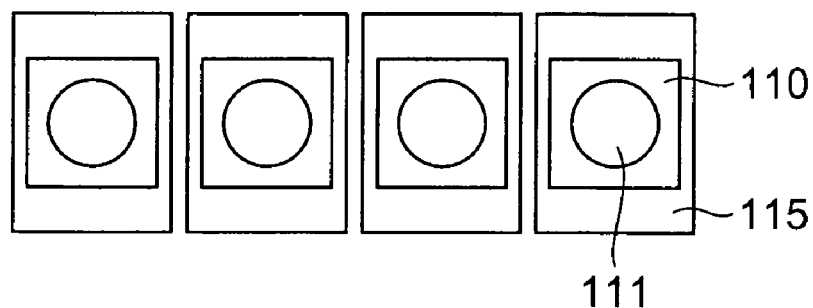
FIG. 17A and FIG. 17B are (A) a top view and (B) a side sectional view, respectively, showing an example of a first constitution of the photodetector array.
Figure 17B:
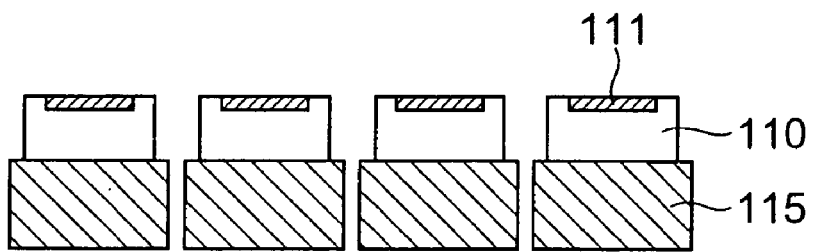

FIG. 17A is a top view showing an example of a first constitution of the photodetector array; and FIG. 17B is a side sectional view thereof. In this example of the constitution, a plurality of photodiodes 110, in which each of the photodiodes has a single light receiving portion 111, is provided; and each of the photodiodes is disposed being arranged each other with respect to the position thereof; thus, a photodiode array is constituted. Or, if necessary, the photo diode array may be constituted in such manner that a plurality of photodiodes 110 is fixed to a sub-mount 115 separately from each other, and each of the photodiodes is disposed being arranged each other with respect to the position thereof. Although such constitution is slightly inferior in the positional accuracy of the photodiodes, such merit that the cost for materials is saved and so on is obtained.

Figure 18A:
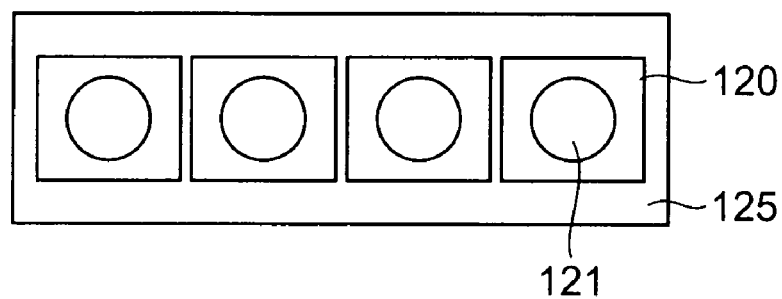
FIG. 18A and FIG. 18B are (A) a top view and (B) a side sectional view, respectively, showing an example of a second structure of the photodetector array.
Figure 18B:
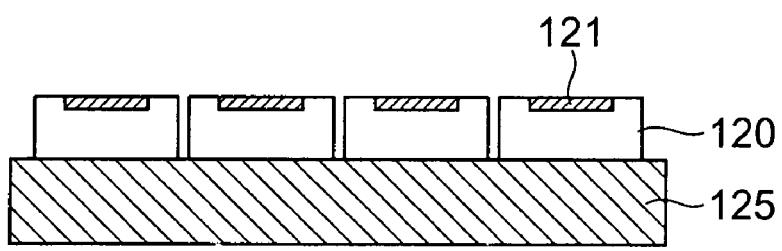

FIG. 18A is a top view showing an example of a second constitution of the photodetector array; and FIG. 18B is a side sectional view thereof. In this example of the constitution, a plurality of photodiodes 120, each has a single light receiving portion 121, is provided. The photodiodes 120 are fixed on a same sub-mount 125 before hand with the position thereof being arranged each other; thus a photodiode array is constituted. The constitution as described above is superior in balance among the points such as positional accuracy, workability and the cost for materials.

Figure 19A:
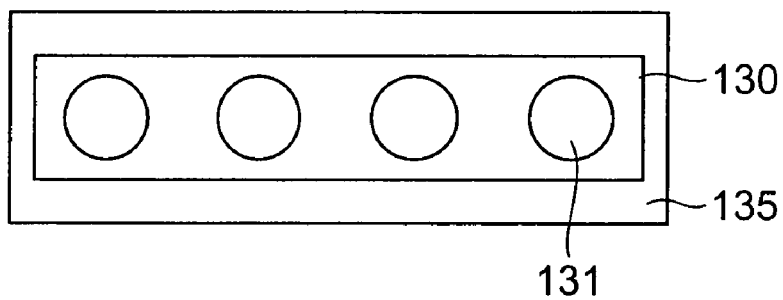
FIG. 19A and FIG. 19B are (A) a top view and (B) a side sectional view, respectively, showing an example of a third structure of the photodetector array.
Figure 19B:
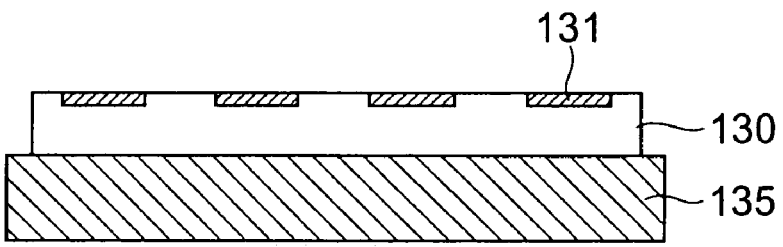

FIG. 19A is a top view showing an example of a third constitution of the photodetector array; and FIG. 19B is a side sectional view thereof. In this example of the constitution, a photodiode array 130 formed integrally including a plurality of light receiving portions 131 is used. Or, if necessary, such constitution that the photodiode array 130 is fixed to a sub-mount 135 may be employed. In the constitution as described above, since the photodetector array is produced in the same process, such merit that the positional accuracy between the adjacent photodiodes is high and the constitution is superior in workability.

INDUSTRIAL APPLICABILITY

As described above, the optical waveguide module according to the present invention is applicable as an optical waveguide module, which is capable of monitoring the optical intensity correctly regardless of the polarization state of the signal light. That is, according to the optical waveguide module, which has such constitution that part of the signal light is reflected by the reflection filter disposed in the inclined groove across the optical waveguide, and is used for monitoring the optical intensity; and the reflected light from the reflection filter is allowed to is made incident onto the light incident face of the photodetector at a predetermined angle with respect thereto, the constitution and manufacturing process of the optical circuit is simplified. Also, since the polarization dependence of the light, which passes through the light incident face, is reduced, the photosensitivity of the reflected light at the photodetectors can be set to a substantially fixed level regardless of the polarization state of the signal light. As a consequence, it is made possible to monitor the optical intensity correctly regardless of the polarization state of the signal light.

The optical waveguide module as described above is applicable as a signal light power monitor, which is inserted in the optical circuit comprised of an optical fiber and optical waveguide of planar optical waveguide type. Or, such constitution is possible; i.e., by providing the optical waveguide module at a predetermined portion of a planar optical waveguide type optical circuit such as optical coupler, optical splitter and optical attenuator, the signal light power is monitored in the optical circuit.

The invention claimed is:

1. An optical waveguide module, comprising:
an optical circuit, constituted by a substrate and an optical waveguide formed on said substrate and having a groove formed at a predetermined inclination angle $\theta(0°<\theta)$ with respect to the vertical axis perpendicular to the optical axis of said optical waveguide so as to cross a predetermined portion of said optical waveguide,
a reflection filter that is installed on the inside of said groove of said optical circuit including a portion where signal light transmitted through said optical waveguide passes through, and that reflects part of said signal light according to a specific reflectivity, and
a photodetector that detects reflected light of said signal light reflected by said reflection filter, wherein said groove of said optical circuit is formed such that said reflection filter, installed on the inside of said groove, reflects part of said signal light as said reflected light to the top surface side of said optical circuit, and said photodetector is arranged such that said reflected light is made incident onto the light incident face thereof at a predetermined angle Φ, between the light incident face and the light incident direction, within a range of 80°–90°.

2. The optical waveguide module according to claim 1, wherein said optical circuit is a planar optical waveguide type optical circuit including an optical waveguide of a planar optical waveguide type formed as said optical waveguide on said substrate.

3. The optical waveguide module according to claim 1, wherein said optical circuit is an optical circuit including optical fiber fixed as said optical waveguide on said substrate.

4. The optical waveguide module according to claim 1, further comprising a mounting member disposed on the top side of said optical circuit for mounting said photodetector on the photodetector mounting face thereof, wherein
said mounting member is disposed with said photodetector mounting face being obliquely inclined at an angle of a $(0°<\alpha<90°)$ with respect to the top surface of said optical circuit such that said reflected light is made incident onto said light incident face of said photodetector at a predetermined angle.

5. The optical waveguide module according to claim 1, further comprising an optical path changing means for changing the light path of said reflected light to a light path effecting incidence onto said light incident face of said photodetector at a predetermined angle with respect thereto.

6. The optical waveguide module according to claim 5, further comprising a mounting member disposed on the top side of said optical circuit for mounting said photodetector on the photodetector mounting face thereof, wherein
said optical path changing means is a reflection mirror formed on a predetermined face of said mounting member.

7. The optical waveguide module according to claim 6, wherein said reflection mirror is a total reflection mirror.

8. The optical waveguide module according to claim 1, wherein said photodetector is mounted on the top surface of said optical circuit, and
said light incident face of said photodetector is obliquely inclined at an angle $\beta(0°<\beta<90°)$ with respect to the top surface of said optical circuit such that said reflected light is made incident onto it at a predetermined angle.

9. The optical waveguide module according to claim 8, wherein a light receiving portion of said photodetector is, viewed from the light path of said reflected light, disposed at a position opposite to said light incident face.

10. The optical waveguide module according to claim 1, wherein said optical circuit has N (N is a plural number) optical waveguides as said optical waveguide, and
a photodetector array having N photodetectors corresponding to said N optical waveguides is provided as said photodetector.

11. The optical waveguide module according to claim 1, wherein a coat film for preventing the reflection of the light within a predetermined wavelength band is formed on said light incident face of said photodetector.

* * * * *